(12) United States Patent
Takahashi et al.

(10) Patent No.: US 11,796,845 B2
(45) Date of Patent: Oct. 24, 2023

(54) LOUVER, VIEWING ANGLE CONTROL ELEMENT AND DISPLAY DEVICE

(71) Applicant: Japan Display Inc., Tokyo (JP)

(72) Inventors: Yasuhiro Takahashi, Tokyo (JP); Jin Hirosawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/151,489

(22) Filed: Jan. 9, 2023

(65) Prior Publication Data

US 2023/0221592 A1 Jul. 13, 2023

(30) Foreign Application Priority Data

Jan. 12, 2022 (JP) .................................. 2022-003105

(51) Int. Cl.
| | | |
|---|---|---|
| *G02F 1/1337* | (2006.01) | |
| *G02F 1/13* | (2006.01) | |
| *G02F 1/1343* | (2006.01) | |
| *G02F 1/137* | (2006.01) | |
| *G02F 1/1335* | (2006.01) | |
| *G02F 1/1333* | (2006.01) | |

(52) U.S. Cl.
CPC ............ *G02F 1/1323* (2013.01); *G02F 1/137* (2013.01); *G02F 1/1337* (2013.01); *G02F 1/133345* (2013.01); *G02F 1/133512* (2013.01); *G02F 1/133553* (2013.01); *G02F 1/134309* (2013.01)

(58) Field of Classification Search
CPC ............ G02F 1/1323; G02F 1/133345; G02F 1/133512; G02F 1/133553; G02F 1/1337; G02F 1/134309; G02F 1/137; G02F 1/133524

See application file for complete search history.

(56) References Cited

U.S. PATENT DOCUMENTS

| | | | | |
|---|---|---|---|---|
| 2006/0164577 A1* | 7/2006 | Lim | ................... | G02F 1/133502 349/114 |
| 2011/0210332 A1* | 9/2011 | Jintyou | .................. | G02F 1/1368 257/E33.072 |
| 2012/0075557 A1* | 3/2012 | Hong | ................. | G02F 1/133526 445/24 |
| 2015/0369972 A1* | 12/2015 | Asaoka | ................ | G02B 5/0257 359/599 |
| 2020/0041842 A1* | 2/2020 | Jeong | ................ | G02F 1/133606 |

FOREIGN PATENT DOCUMENTS

JP 2004-20725 A 1/2004

* cited by examiner

*Primary Examiner* — James A Dudek
(74) *Attorney, Agent, or Firm* — XSENSUS LLP

(57) ABSTRACT

According to one embodiment, a louver includes a first transparent substrate, a first organic insulating film provided on an inner surface side of the first transparent substrate, and including a first inclined surface and a second inclined surface, a first reflective layer provided along the first inclined surface, and a second reflective layer provided along the second inclined surface. The first reflective layer includes a first reflective surface. The second reflective layer includes a second reflective surface. An interval between the first reflective surface and the second reflective surface increases with distance from the first transparent substrate.

11 Claims, 15 Drawing Sheets

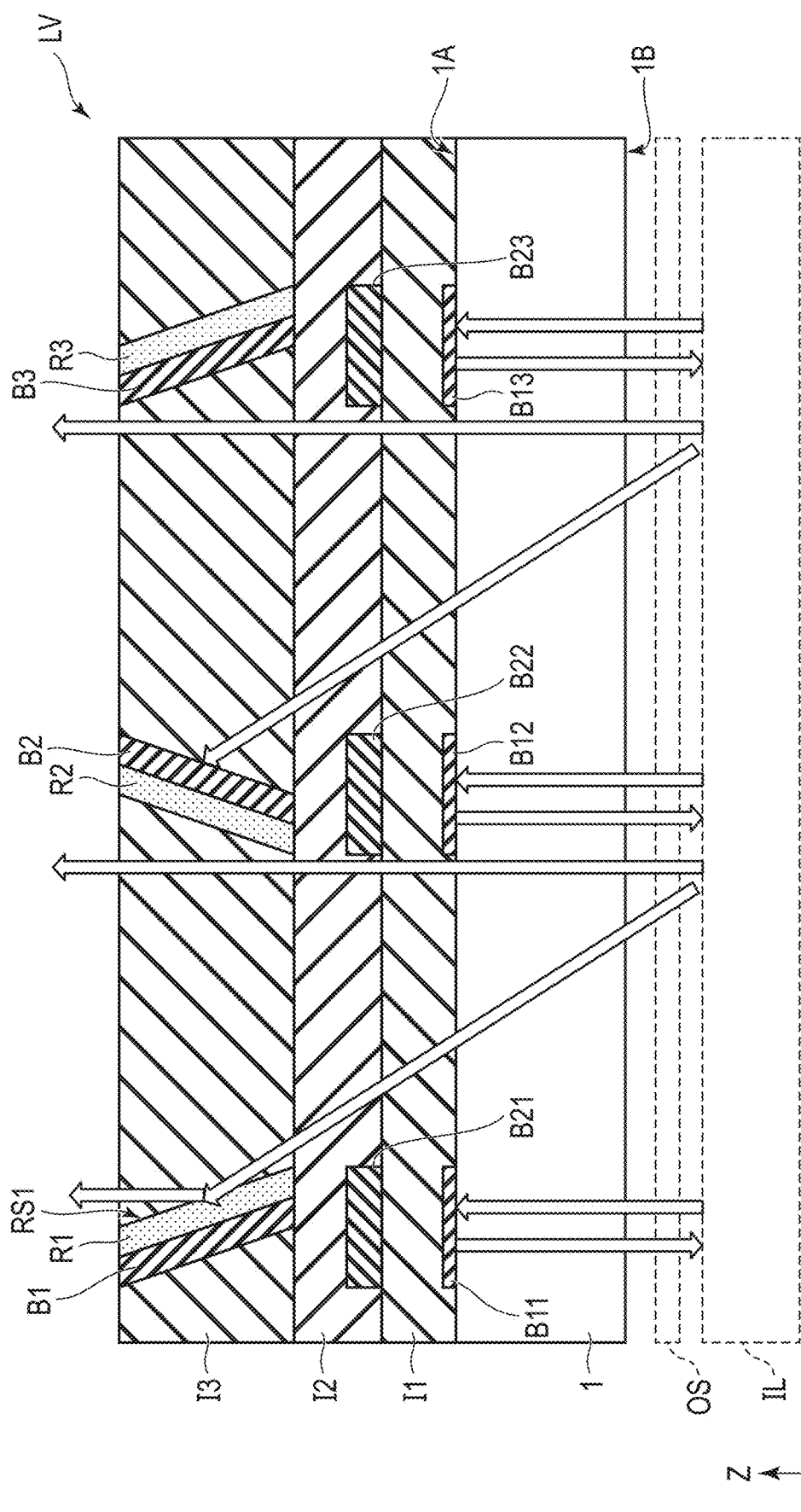
F I G. 5

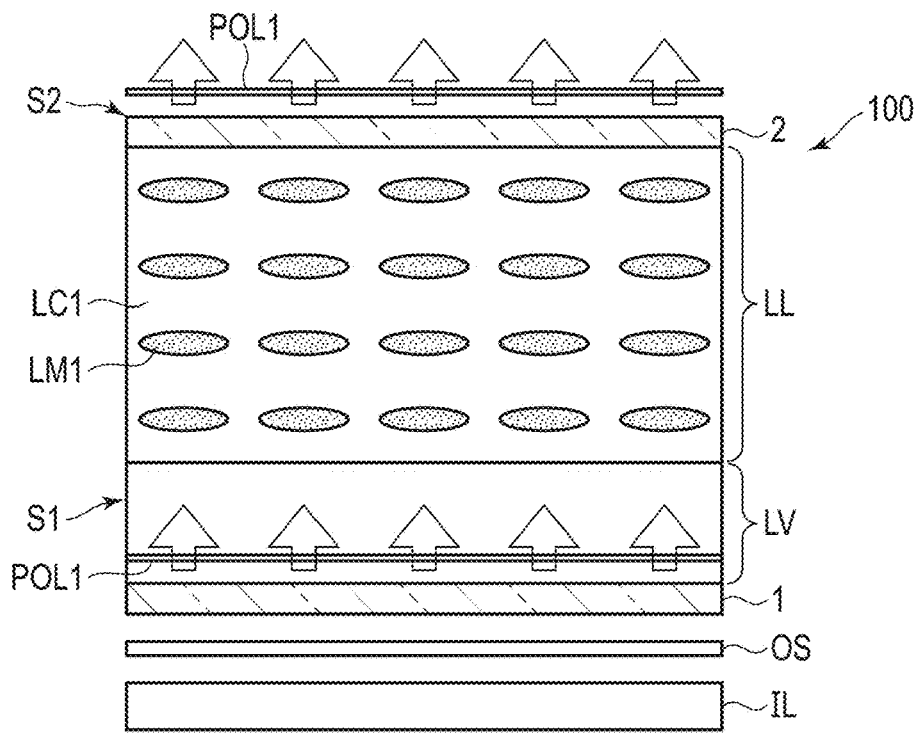
F I G. 9
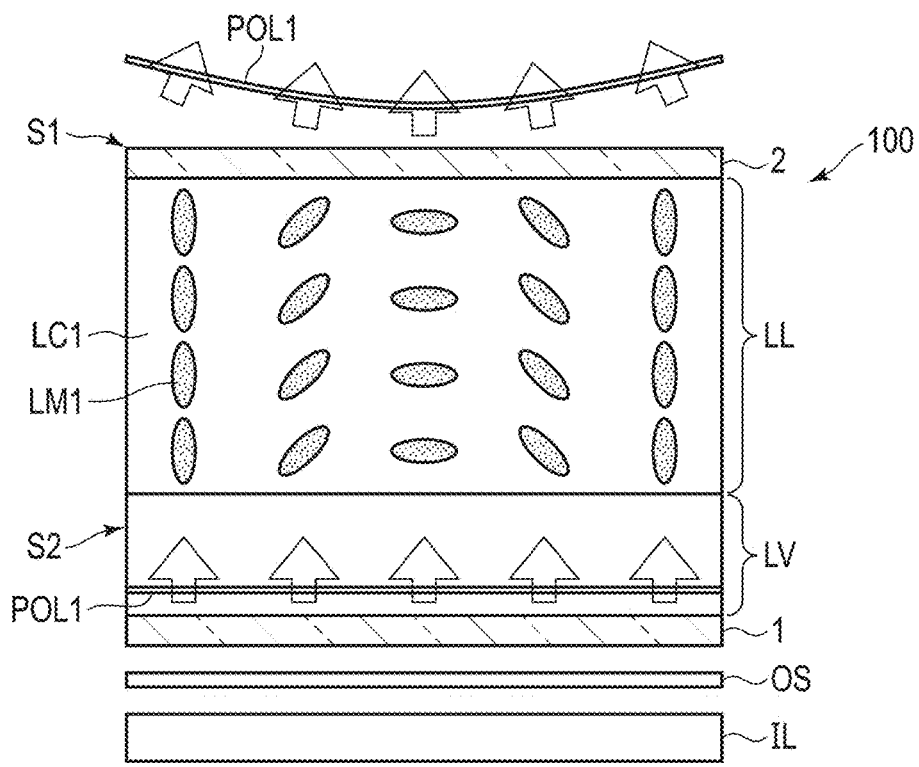
F I G. 10

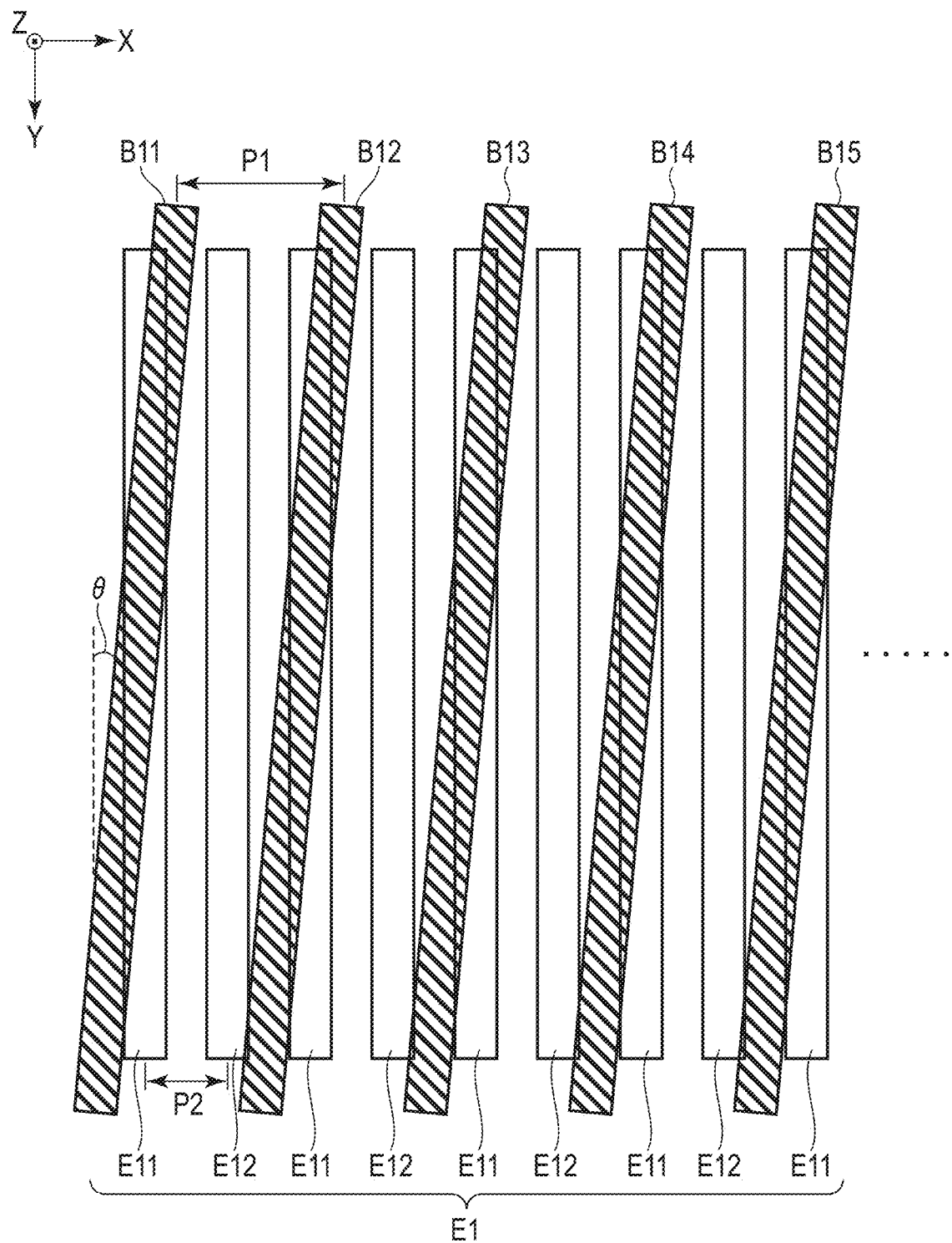
F I G. 13

LOUVER, VIEWING ANGLE CONTROL ELEMENT AND DISPLAY DEVICE

CROSS-REFERENCE TO RELATED APPLICATIONS

This application is based upon and claims the benefit of priority from Japanese Patent Application No. 2022-003105, filed Jan. 12, 2022, the entire contents of which are incorporated herein by reference.

FIELD

Embodiments described herein relate generally to a louver, a viewing angle control element and a display device.

BACKGROUND

In recent years, various types of optical elements attached to the display surfaces of liquid crystal panels for controlling a viewing angle have been suggested. Such an optical element comprises, for example, a louver layer which limits the transmission angle of light. The louver layer is formed by alternately stacking a light transmission layer and a light-shielding layer. The bonded surface of the light transmission layer and the light-shielding layer inclines at a predetermined angle with respect to the thickness direction of the louver layer.

When this optical element is applied, the thickness of the entire device is increased.

BRIEF DESCRIPTION OF THE DRAWINGS

FIG. 5 is a diagram for explaining the optical function of the louver LV shown in FIG. 4.

FIG. 9 is a diagram schematically showing the viewing angle control element 100 in an off-state (OFF) where no electric field is formed in a liquid crystal layer LC1.

FIG. 10 is a diagram schematically showing the viewing angle control element 100 in an on-state (ON) where an electric field is formed in the liquid crystal layer LC1.

FIG. 13 is a plan view showing examples of a first electrode E1 and light shields B11 to B15.

DETAILED DESCRIPTION

Figure 1:
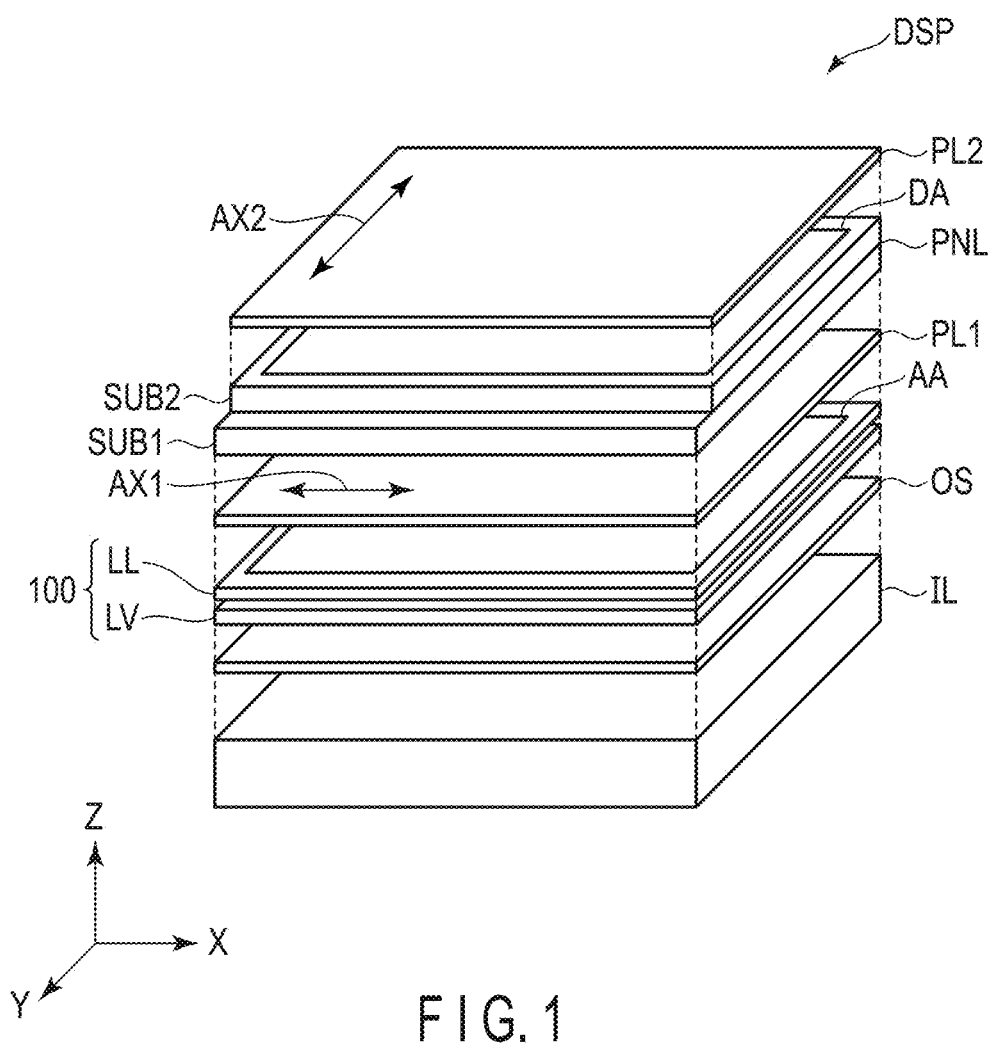
FIG. 1 is an exploded perspective view showing a display device DSP according to an embodiment.

In general, according to one embodiment, a louver comprises a first transparent substrate, a first organic insulating film provided on an inner surface side of the first transparent substrate, and comprising a first inclined surface, a second inclined surface facing the first inclined surface, and a third inclined surface facing the second inclined surface, a first reflective layer provided along the first inclined surface, a second reflective layer spaced apart from the first reflective layer and provided along the second inclined surface, and a second organic insulating film which covers the first reflective layer and the second reflective layer. The first reflective layer comprises a first reflective surface which is in contact with the second organic insulating film. The second reflective layer comprises a second reflective surface which is in contact with the second organic insulating film. An interval between the first reflective surface and the second reflective surface increases with distance from the first transparent substrate.

According to another embodiment, a viewing angle control element comprises a first transparent substrate, a first electrode provided on an inner surface side of the first transparent substrate, a first alignment film which covers the first electrode, a second transparent substrate, a second electrode provided on an inner surface side of the second transparent substrate and facing the first electrode, a second alignment film which covers the second electrode, a liquid crystal layer provided between the first alignment film and the second alignment film, a first organic insulating film comprising a first inclined surface, a second inclined surface facing the first inclined surface, and a third inclined surface facing the second inclined surface, a first light-shielding layer provided in the first inclined surface, a second light-shielding layer spaced apart from the first light-shielding layer and provided in the second inclined surface, a first reflective layer stacked in the first light-shielding layer, a second reflective layer spaced apart from the first reflective layer and stacked in the second light-shielding layer, and a second organic insulating film which covers the first reflective layer and the second reflective layer. The first reflective layer comprises a first reflective surface which is in contact with the second organic insulating film. The second reflective layer comprises a second reflective surface which is in contact with the second organic insulating film. An interval between the first reflective surface and the second reflective surface increases with distance from the first transparent substrate.

According to yet another embodiment, a display device comprises an illumination device, a display panel comprising a plurality of pixels provided in matrix, and a viewing angle control element provided between the illumination device and the display panel. The viewing angle control element comprises a first transparent substrate facing the illumination device, a first electrode provided on an inner surface side of the first transparent substrate, a first alignment film which covers the first electrode, a second transparent substrate facing the display panel, a second electrode provided on an inner surface side of the second transparent substrate and facing the first electrode, a second alignment film which covers the second electrode, a liquid crystal layer provided between the first alignment film and the second alignment film, a first organic insulating film comprising a first inclined surface, a second inclined surface facing the first inclined surface, and a third inclined surface facing the second inclined surface, a first light-shielding layer provided in the first inclined surface, a second light-shielding layer spaced apart from the first light-shielding layer and provided in the second inclined surface, a first reflective layer stacked in the first light-shielding layer, a second reflective layer spaced apart from the first reflective layer and stacked in the second light-shielding layer, and a second organic insulating film which covers the first reflective layer and the second reflective layer. The first reflective layer comprises a first reflective surface which is in contact with the second organic insulating film. The second reflective layer comprises a second reflective surface which is in contact with the second organic insulating film. An interval between the first reflective surface and the second reflective surface increases with distance from the first transparent substrate.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction parallel to the X-axis is referred to as an X-direction or a first direction. A direction parallel to the Y-axis is referred to as a Y-direction or a second direction. A direction parallel to the Z-axis is referred to as a Z-direction or a third direction. The plane defined by the X-axis and the Y-axis is referred to as an X-Y plane. A plan view is defined as appearance when the X-Y plane is viewed.

FIG. 1 is an exploded perspective view showing a display device DSP according to an embodiment.

The display device DSP comprises an illumination device IL, an optical sheet OS, a viewing angle control element 100, a display panel PNL, a first polarizer PL1 and a second polarizer PL2. For example, the first direction X is a direction parallel to the short sides of the display panel PNL. The second direction Y is a direction parallel to the long sides of the display panel PNL. The third direction Z is the thickness direction of the display panel PNL.

The illumination device IL is configured to emit illumination light toward the display panel PNL. The illumination light is, for example, non-polarized light. However, the illumination light may be linearly polarized light.

The optical sheet OS is provided between the illumination device IL and the viewing angle control element 100 in the third direction Z. The optical sheet OS is, for example, a reflective polarizing sheet, and is configured to reflect, of illumination light, s-polarized light and transmit p-polarized light.

The viewing angle control element 100 is provided between the optical sheet OS and the first polarizer PL1 in the third direction Z. The viewing angle element 100 comprises an effective area AA which controls the emission direction of incident light (illumination light). The viewing angle control element 100 comprises a louver LV and a liquid crystal lens element LL. The louver LV is provided between the optical element OS and the liquid crystal lens element LL in the third direction Z. The louver LV is configured to control the spread of the light which passed through the optical sheet OS. The liquid crystal lens element LL is provided between the louver LV and the first polarizer PL1 in the third direction Z. The liquid crystal lens element LL is configured to control the spread of the light which passed through the louver LV.

The polarization axis AX1 of the first polarizer PL1 is orthogonal to the polarization axis AX2 of the second polarizer PL2. For example, polarization axis AX1 is parallel to the first direction X, and polarization axis AX2 is parallel to the second direction Y.

The display panel PNL is provided between the first polarizer PL1 and the second polarizer PL2 in the third direction Z. The display panel PNL is, for example, a liquid crystal panel which holds a liquid crystal layer between a pair of substrates SUB1 and SUB2. However, the illumination target of the illumination device IL is not limited to a liquid crystal panel and may be a display panel PNL comprising another configuration. The display panel PNL comprises a display area DA which displays an image. The display area DA overlaps the effective area AA in the third direction Z.

The details of the display panel PNL and the liquid crystal device 100 are described later.

Figure 2:
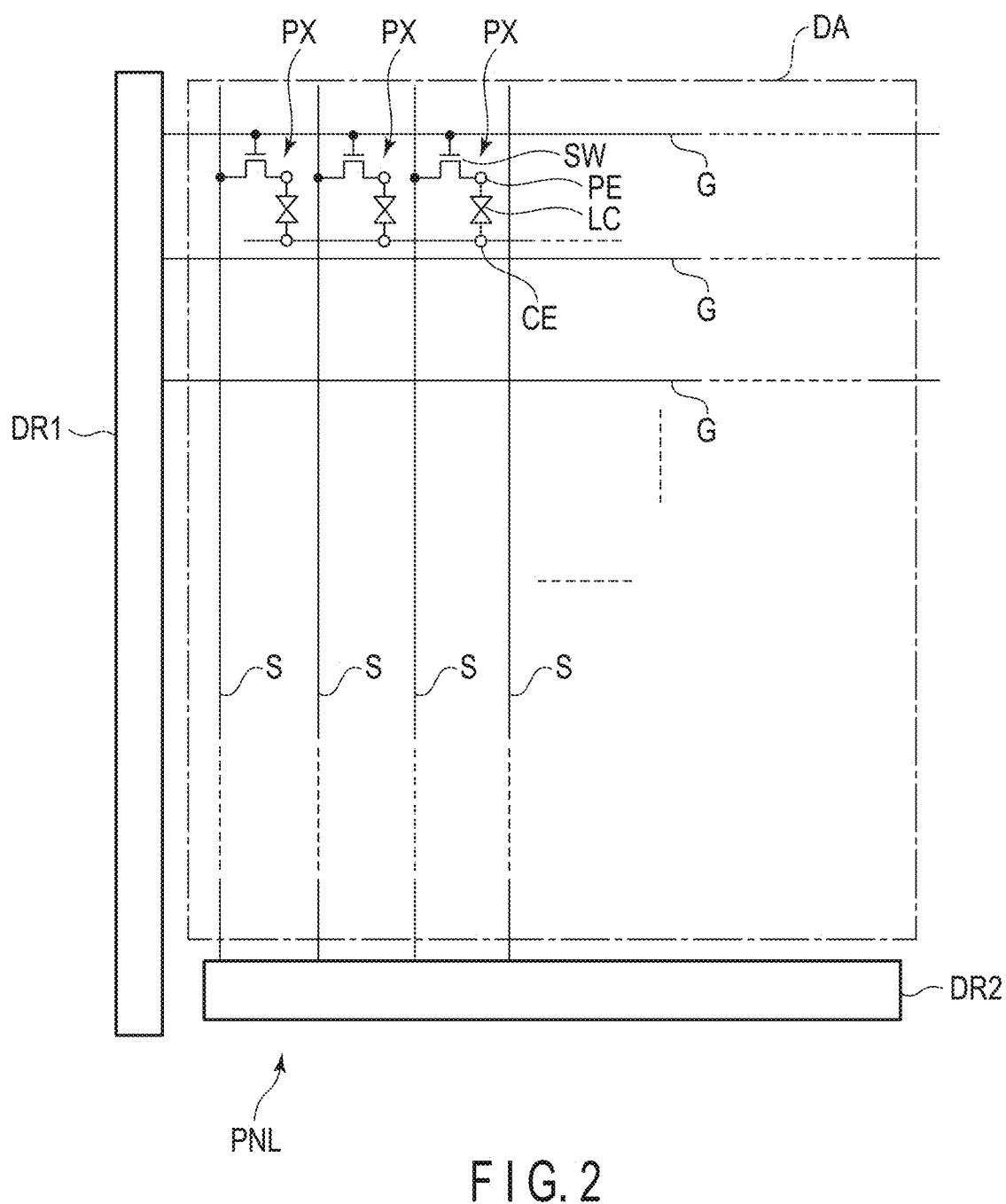
FIG. 2 is a diagram showing an example of an equivalent circuit of the display panel PNL shown in FIG. 1.

FIG. 2 is a diagram showing an example of an equivalent circuit of the display panel PNL shown in FIG. 1.

The display panel PNL comprises a plurality of pixels PX, a plurality of scanning lines G and a plurality of signal lines S in the display area DA. The scanning lines G and the signal lines S intersect each other. For example, the scanning lines G extend in the first direction X shown in FIG. 1, and the signal lines S extend in the second direction Y.

The display panel PNL comprises a first driver DR1 and a second driver DR2 outside the display area DA. The scanning lines G are electrically connected to the first driver DR1. The signal lines S are electrically connected to the second driver DR2. The first driver DR1 and the second driver DR2 are controlled by a controller.

Each pixel PX shown here is called a subpixel, a color pixel, etc., and is equivalent to, for example, a red pixel which exhibits red, a green pixel which exhibits green, a blue pixel which exhibits blue, a white pixel which exhibits white, etc. Each pixel PX is defined by, for example, two adjacent scanning lines G and two adjacent signal lines S.

Each pixel PX comprises a switching element SW, a pixel electrode PE and a common electrode CE facing the pixel electrode PE. The switching element SW is electrically connected to a scanning line G and a signal line S. The pixel electrode PE is electrically connected to the switching element SW. Thus, the pixel electrode PE is electrically connected to the signal line S via the switching element SW. The common electrode CE is formed over a plurality of pixels PX. Common potential is applied to the common electrode CE.

The first driver DR1 supplies a scanning signal to the scanning lines G. The second driver DR2 supplies a video signal to the signal lines S. In the switching element SW electrically connected to a scanning line G to which a scanning signal has been supplied, the signal line S is electrically connected to the pixel electrode PE, and voltage is applied to the pixel electrode PE based on the video signal supplied to the signal line S. A liquid crystal layer LC is driven by an electric field generated between the pixel electrode PE and the common electrode CE.

Figure 3:
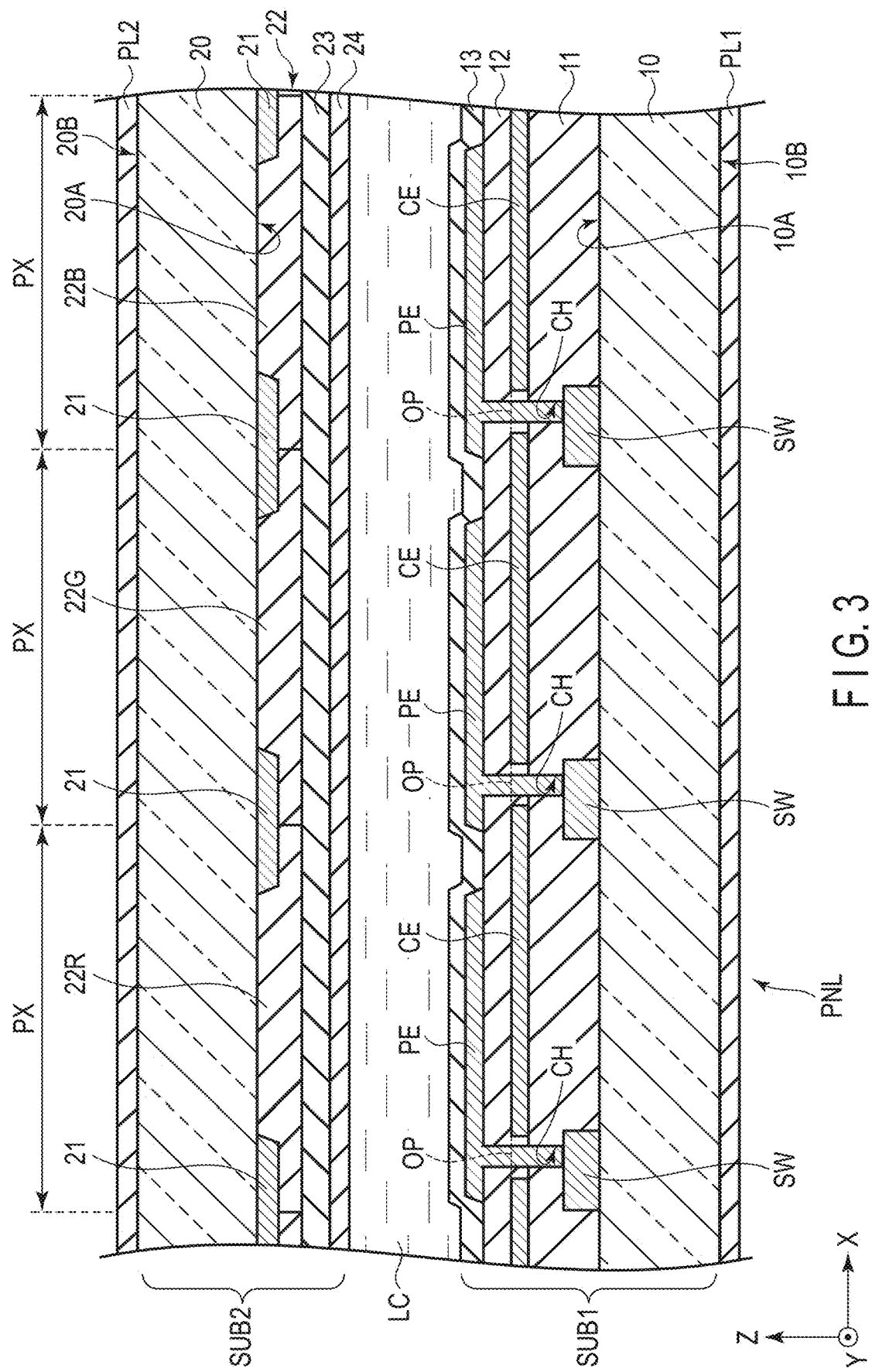
FIG. 3 is a cross-sectional view showing an example of the structure of the display panel PNL shown in FIG. 1.

FIG. 3 is a cross-sectional view showing an example of the structure of the display panel PNL shown in FIG. 1.

The display panel PNL comprises the substrate SUB1, the substrate SUB2 and the liquid crystal layer LC. Here, this specification explains a display panel PNL corresponding to a display mode using a lateral electric field parallel to the main surfaces of the substrates. However, the configuration of the display panel PNL is not limited to this example. The display panel PNL may be configured to correspond to any of a display mode using a longitudinal electric field parallel to the normal of the main surfaces of the substrates, a display mode using an inclined electric field inclining at a tilt with respect to the main surfaces of the substrates, and a display mode using an appropriate combination of the lateral electric field, longitudinal electric field and inclined electric field described above. Here, the main surfaces of the substrates are surfaces parallel to the X-Y plane.

The substrate SUB1 comprises a transparent substrate 10, insulating layers 11 and 12 and an alignment film 13 in addition to the switching elements SW, the pixel electrodes PE and the common electrode CE. The substrate SUB1 further comprises the scanning lines G, signal lines S, first driver DR1 and second driver DR2 shown in FIG. 2, etc. The transparent substrate 10 comprises an inner surface 10A facing the liquid crystal layer LC, and an outer surface 10B on the opposite side of the inner surface 10A. The first polarizer PL1 is attached to the outer surface 10B.

The switching elements SW are provided in the inner surface 10A and are covered with the insulating layer 11. In the example shown in FIG. 3, for convenience sake, the switching elements SW are simplified, and the scanning lines G and the signal lines S are omitted. In fact, the insulating layer 11 includes a plurality of insulating layers. Each switching element SW includes a semiconductor layer and various electrodes formed in these insulating layers.

The common electrode CE is provided over a plurality of pixels PX on the insulating layer 11 and is covered with the insulating layer 12. The pixel electrode PE of each pixel PX is provided on the insulating layer 12 and faces the common electrode CE via the insulating layer 12. The pixel electrode PE is electrically connected to the switching element SW through the opening OP of the common electrode CE and a contact hole CH penetrating the insulating layers 11 and 12. The alignment film 13 covers the pixel electrodes PE and the insulating layer 12 and is in contact with the liquid crystal layer LC.

The substrate SUB2 comprises a transparent substrate 20, a light-shielding layer 21, a color filter layer 22, an overcoat layer 23 and an alignment film 24. The transparent substrate 20 comprises an inner surface 20A facing the liquid crystal layer LC, and an outer surface 20B on the opposite side of the inner surface 20A. The second polarizer PL2 is attached to the outer surface 20B.

The light-shielding layer 21 is provided in the inner surface 20A and is provided in the boundary between adjacent pixels PX. As described later, the light-shielding layer 21 is formed into a grating shape overlapping the scanning lines G and the signal lines S and defines the pixels PX. The color filter layer 22 comprises a red color filter 22R, a green color filter 22G and a blue color filter 22B. The overcoat layer 23 covers the color filter layer 22. The alignment film 24 cover the overcoat layer 23 and is in contact with the liquid crystal layer LC.

The transparent substrate 10 and the transparent substrate 20 are insulating substrates such as a glass substrate or a resinous substrate. The pixel electrodes PE and the common electrode CE are, for example, transparent electrodes formed of a transparent conductive material such as indium tin oxide (ITO) or indium zinc oxide (IZO).

Figure 4:
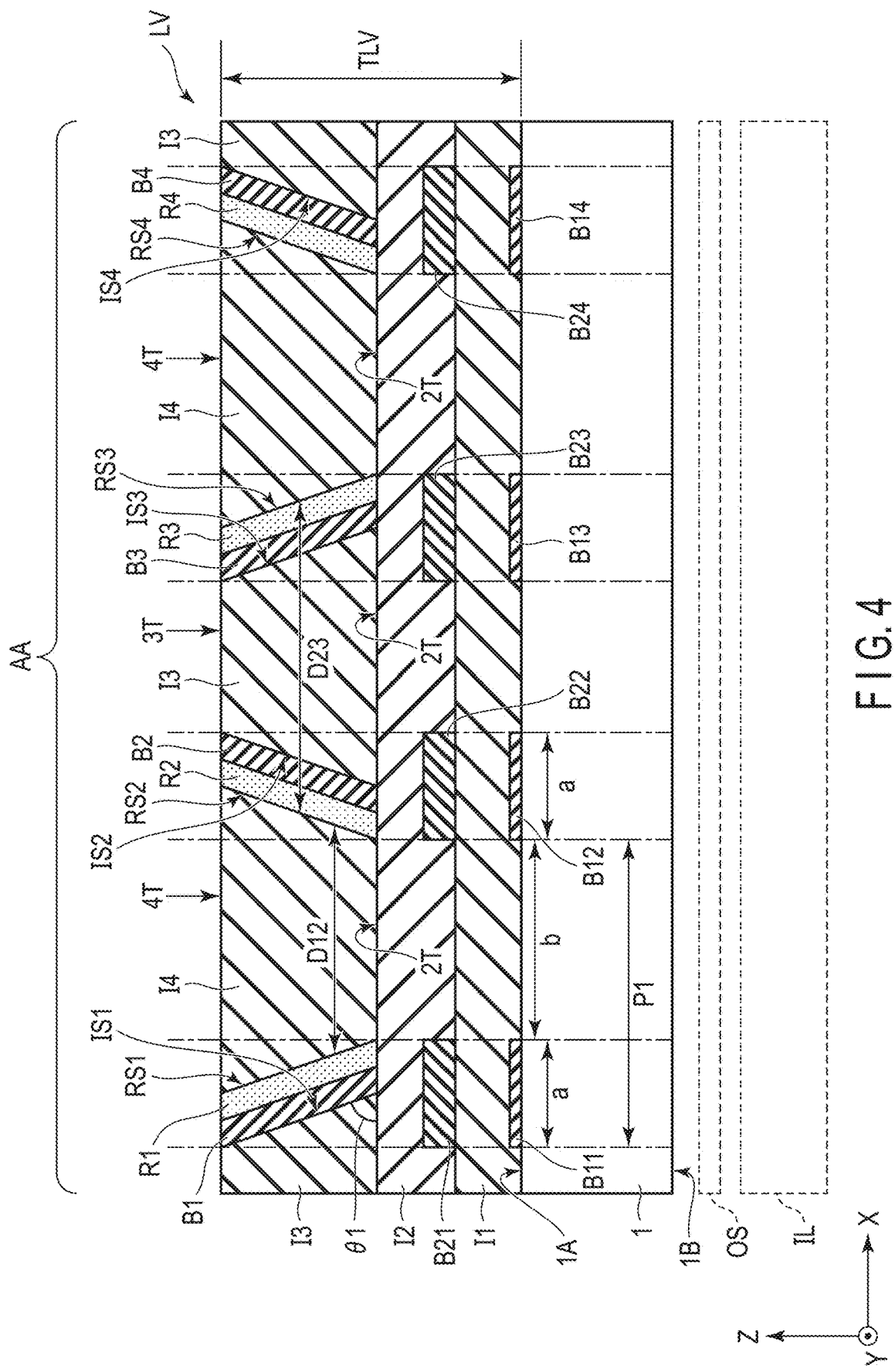
FIG. 4 is a cross-sectional view showing an example of the structure of the louver LV shown in FIG. 1.

FIG. 4 is a cross-sectional view showing an example of the structure of the louver LV shown in FIG. 1. Here, the cross-sectional structure of part of the effective area AA is shown.

The louver LV comprises a first transparent substrate 1, light shields B11 to B14, light shields B21 to B24, light-shielding layers B1 to B4, reflective layers R1 to R4 and organic insulating films I1 to I4.

The first transparent substrate 1 comprises an inner surface 1A and an outer surface 1B on the opposite side of the inner surface 1A. The outer surface 1B faces the optical sheet OS and the illumination device IL shown by dotted lines. The first transparent substrate 1 is, for example, an insulating substrate such as a glass substrate or a resinous substrate.

The light shields B11 to B14 are provided in the inner surface 1A of the first transparent substrate 1. The light shields B11 to B14 are arranged in the first direction X with a first pitch P1. As described later, each of these light shields B11 to B14 is formed into a stripe shape extending in a direction (substantially the second direction Y) intersecting with the first direction X. The light shields B11 to B14 are parallel to each other. The light shields B11 to B14 are formed of, for example, a metal material. However, they may be formed of a resinous material containing black pigment.

Each of the light shields B11 to B14 has width "a" in the first direction X. The interval "b" between the light shields B11 and B12 arranged in the first direction X is greater than width "a". For example, interval "b" is approximately three times width "a". The first pitch P1 is equivalent to the sum of width "a" and interval "b".

The organic insulating film I1 covers the light shields B11 to B14 and also covers the first transparent substrate 1.

The light shields B21 to B24 are provided on the organic insulating film I1. The light shields B21 to B24 are in contact with the organic insulating film I1 and are arranged with the first pitch P1 in the first direction X. These light shields B21 to B24 overlap the light shields B11 to B14, respectively, and are formed into stripe shapes parallel to the light shields B11 to B14, respectively. In other words, the light shield B21 is located immediately above the light shield B11 across the intervening organic insulating film I1. The light shield B22 is located immediately above the light shield B12 across the intervening organic insulating film I1. The light shield B23 is located immediately above the light shield B13 across the intervening organic insulating film I1. The light shield B24 is located immediately above the light shield B14 across the intervening organic insulating film I1. The light shields B21 to B24 are formed of, for example, a resinous material containing black pigment.

The width of each of the light shields B21 to B24 is equal to the width "a" of each of the light shields B11 to B14. The interval of the light shields B21 to B24 arranged in the first direction X are equal to the interval "b" of the light shields B11 to B14.

The organic insulating film I2 covers the light shields B21 to B24 and also covers the organic insulating film I1.

The organic insulating film I3 is equivalent to a first organic insulating film provided on the inner surface 1A side. The organic insulating film I3 comprises a first inclined surface IS1, a second inclined surface IS2 which faces the first inclined surface IS1 in the first direction X, a third inclined surface IS3 which faces the second inclined surface IS2 in the first direction X, and a fourth inclined surface IS4 which faces the third inclined surface IS3 in the first direction X. The first inclined surface IS1, the second inclined surface IS2, the third inclined surface IS3 and the fourth inclined surface IS4 incline with respect to the X-Y plane, and extend in directions intersecting with the first direction. In other words, the organic insulating film I3 comprises a plurality of trenches extending in substantially the second direction Y. The angle θ1 of inclination of each of the first inclined surface IS1, the second inclined surface IS2, the third inclined surface IS3 and the fourth inclined surface IS4 is, for example, greater than or equal to 80° but less than 90°.

The first inclined surface IS1 and the second inclined surface IS2 are formed such that the interval between them in the first direction X increases with distance from the first transparent substrate 1. The second inclined surface IS2 and the third inclined surface IS3 are formed such that the interval between them in the first direction X decreases with distance from the first transparent substrate 1. In other words, the organic insulating film I3 has a tapered cross-sectional shape such that the width in the first direction X decreases with distance from the first transparent substrate 1 between the second inclined surface IS2 and the third inclined surface IS3.

The light-shielding layer B1 is equivalent to a first light-shielding layer provided in the first inclined surface IS1.

The light-shielding layer B2 is equivalent to a second light-shielding layer provided in the second inclined surface IS2. The light-shielding layer B2 is spaced apart from the light-shielding layer B1. In other words, the upper surface 2T of the organic insulating film I2 is exposed between the light-shielding layer B1 and the light-shielding layer B2.

The light-shielding layer B3 is equivalent to a third light-shielding layer provided in the third inclined surface IS3. The light-shielding layer B3 is spaced apart from the light-shielding layer B2. In other words, the upper surface 3T of the organic insulating film I3 is exposed between the light-shielding layer B2 and the light-shielding layer B3.

The light-shielding layer B4 is equivalent to a fourth light-shielding layer provided in the fourth inclined surface IS4. The light-shielding layer B4 is spaced apart from the light-shielding layer B3. In other words, the upper surface 2T of the organic insulating film I2 is exposed between the light-shielding layer B3 and the light-shielding layer B4.

The reflective layer R1 is equivalent to a first reflective layer provided along the first inclined surface IS1. The reflective layer R1 is stacked in the light-shielding layer B1.

The light-shielding layer B1 and the reflective layer R1 overlap the light shield B21 and are formed into stripe shapes parallel to the light shield B21. In other words, the light-shielding layer B1 and the reflective layer R1 are located immediately above the light shields B11 and B21 across the intervening organic insulating film I2.

The reflective layer R2 is equivalent to a second reflective layer provided along the second inclined surface IS2. The reflective layer R2 is stacked in the light-shielding layer B2. The reflective layer R2 is spaced apart from the reflective layer R1. In other words, the upper surface 2T of the organic insulating film I2 is exposed between the reflective layer R1 and the reflective layer R2.

The light-shielding layer B2 and the reflective layer R2 overlap the light shield B22 and are formed into stripe shapes parallel to the light shield B22. In other words, the light-shielding layer B2 and the reflective layer R2 are located immediately above the light shields B12 and B22 across the intervening organic insulating film I2.

The reflective layer R3 is equivalent to a third reflective layer provided along the third inclined surface IS3. The reflective layer R3 is stacked in the light-shielding layer B3. The reflective layer R3 is spaced apart from the reflective layer R2. In other words, the upper surface 3T of the organic insulating film I3 is exposed between the reflective layer R2 and the reflective layer R3.

The light-shielding layer B3 and the reflective layer R3 overlap the light shield B23 and are formed into stripe shapes parallel to the light shield B23. In other words, the light-shielding layer B3 and the reflective layer R3 are located immediately above the light shields B13 and B23 across the intervening organic insulating film I2.

The reflective layer R4 is equivalent to a fourth reflective layer provided along the fourth inclined surface IS4. The reflective layer R4 is stacked in the light-shielding layer B4. The reflective layer R4 is spaced apart from the reflective layer R3. In other words, the upper surface 2T of the organic insulating film I2 is exposed between the reflective layer R3 and the reflective layer R4.

The light-shielding layer B4 and the reflective layer R4 overlap the light shield B24 and are formed into stripe shapes parallel to the light shield B24. In other words, the light-shielding layer B4 and the reflective layer R4 are located immediately above the light shields B14 and B24 across the intervening organic insulating film I2.

The reflective layers R1 to R4 are formed of, for example, a metal material such as aluminum, silver and titanium. The light-shielding layers B1 to B4 are formed of, for example, a resinous material containing black pigment. It should be noted that the light-shielding layers B1 to B4 may be omitted. In this case, each of the reflective layers R1 to R4 is provided so as to be in contact with the inclined surface of the organic insulating film I3.

The organic insulating film I4 is equivalent to a second organic insulating film which covers the reflective layers R1 to R4. The organic insulating film I4 is in contact with the organic insulating film I2 between the reflective layer R1 and the reflective layer R2 and is in contact with the organic insulating film I2 between the reflective layer R3 and the reflective layer R4. The upper surface 4T of the organic insulating film I4 is located between a first reflective surface RS1 and a second reflective surface RS2 and between a third reflective surface RS3 and a fourth reflective surface RS4.

The organic insulating films I1 to I4 are formed of, for example, a transparent resinous material such as acrylic resin. The thickness TLV which is the sum of the thicknesses of the organic insulating film I1, the organic insulating film I2 and the organic insulating film I3 in the third direction Z is greater than width "a" and is greater than interval "b". For example, thickness TLV is approximately six times width "a".

The reflective layer R1 comprises the first reflective surface RS1 which is in contact with the organic insulating film I4.

The reflective layer R2 comprises the second reflective surface RS2 which is in contact with the organic insulating film I4.

The reflective layer R3 comprises the third reflective surface RS3 which is in contact with the organic insulating film I4.

The reflective layer R4 comprises the fourth reflective surface RS4 which is in contact with the organic insulating film I4.

The interval D12 between the first reflective surface RS1 and the second reflective surface RS2 in the first direction X increases with distance from the first transparent substrate 1. In other words, the width of the upper surface 2T between the first reflective surface RS1 and the second reflective surface RS2 is equivalent to the minimum value of interval D12 and is equal to, for example, width b. The width of the upper surface 4T between the first reflective surface RS1 and the second reflective surface RS2 is equivalent to the maximum value of interval D12.

The interval D23 between the second reflective surface RS2 and the third reflective surface RS3 in the first direction X decreases with distance from the first transparent substrate 1. In other words, the interval between the second reflective surface RS2 and the third reflective surface RS3 along the upper surface 2T is equivalent to the maximum value of interval D23. The interval between the second reflective surface RS2 and the third reflective surface RS3 along the upper surface 3T is equivalent to the minimum value of interval D23.

In this louver LV, for example, the light shield B11 is equivalent to a first light shield. The light shield B12 is equivalent to a second light shield. The light shield B21 is equivalent to a third light shield. The light shield B22 is equivalent to a fourth light shield. The organic insulating film I1 is equivalent to a first insulating film. The organic insulating film I2 is equivalent to a second insulating film.

FIG. 5 is a diagram for explaining the optical function of the louver LV shown in FIG. 4.

The illumination light emitted from the illumination device IL passes through the optical sheet OS and subsequently enters the louver LV through the outer surface 1B of the first transparent substrate 1.

First, the incident light which passes between the light shields B11 and B12 is explained. The incident light passes between the light shields B11 and B12, passes between the light shields B21 and B22 and passes between the reflective layers R1 and R2. At this time, of the incident light, the light parallel to the third direction Z parallel to the normal of the louver LV goes straight and passes through the louver LV. Of the incident light, for example, the oblique light which goes to the reflective layer R1 is reflected on the first reflective surface RS1 and passes through the louver LV in a manner similar to that of the light parallel to the third direction Z. In this way, between the light shields B11 and B12, the emission direction of the illumination light is controlled as oblique light is reflected on the reflective layer. Further, the illumination light is collimated.

Next, the incident light which passes between the light shields B12 and B13 is explained. The incident light passes between the light shields B12 and B13, passes between the light shields B22 and B23 and passes between the light-shielding layers B2 and B3. At this time, of the incident light, the light parallel to the third direction Z parallel to the normal of the louver LV goes straight and passes through the louver LV. Of the incident light, for example, the oblique light which goes to the light-shielding layer B2 is absorbed by the light-shielding layer B2. In this way, between the light shields B12 and B13, the emission direction of the illumination light is controlled as oblique light is absorbed by the light-shielding layer. Further, the illumination light is collimated.

Of the incident light, the light which goes to the light shields B11 to B13 is reflected on the surfaces of the light shields B11 to B13 formed of a metal material toward the illumination device IL. The reflectance of the light shields B11 to B13 is greater than or equal to at least 50%. Thus, compared to a case where the light shields B11 to B13 are formed of a light-absorbing material, the use efficiency of illumination light is improved.

Now, this specification explains a configuration example of the viewing angle control element 100 into which the louver LV and the liquid crystal lens element LL are incorporated.

Figure 6:
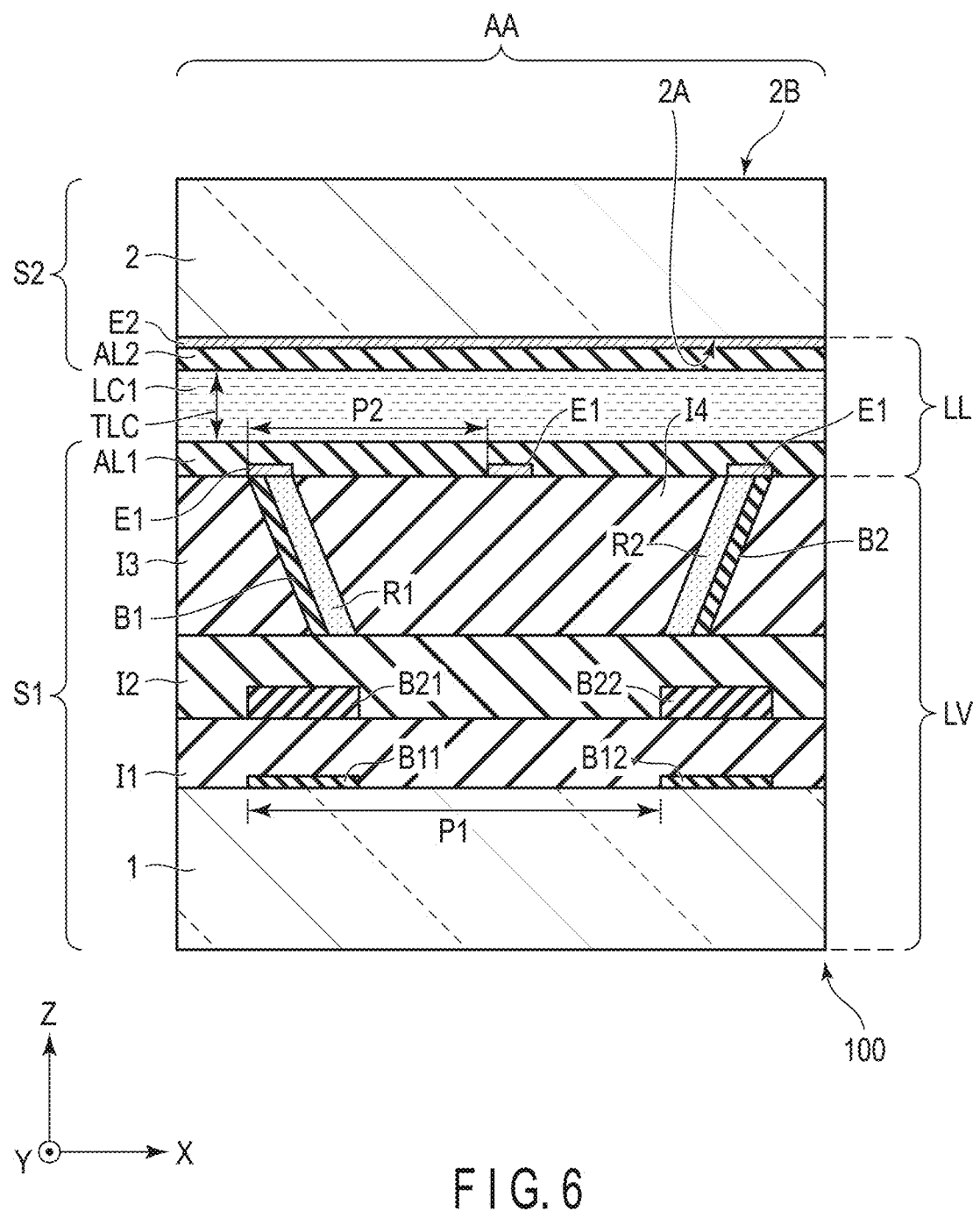
FIG. 6 is a cross-sectional view showing a configuration example of the structure of the viewing angle control element 100 shown in FIG. 1.

FIG. 6 is a cross-sectional view showing a configuration example of the structure of the viewing angle control element 100 shown in FIG. 1. Here, the cross-sectional structure of part of the effective area AA is shown.

The viewing angle control element 100 comprises a first substrate S1, a second substrate S2 and a liquid crystal layer LC1.

Between a pair of transparent substrates 1 and 2, the viewing angle control element 100 comprises the louver LV which controls the emission direction of incident light (illumination light) and collimates incident light, and the liquid crystal lens element LL which adjusts the degree of the divergence of the collimated incident light.

In the example of FIG. 6, the louver LV is incorporated into the first substrate S1. The viewing angle control element 100 is configured to control the emission direction of incident light (illumination light) in the effective area AA by the combination of the louver LV and the liquid crystal lens element LL. Hereinafter, this specification explains the configuration of each portion.

The first substrate S1 comprises the first transparent substrate 1, the light shields B11 and B12, the light shields B21 and B22, the light-shielding layers B1 and B2, the reflective layers R1 and R2, the organic insulating films I1 to I4, a plurality of first electrodes E1 and a first alignment film AL1. As the louver LV is explained with reference to FIG. 4 above, explanation thereof is omitted here. The light-shielding layers B1 and B2, the reflective layers R1 and R2 and the organic insulating films I3 and I4 constituting the louver LV are located between the first transparent substrate 1 and the liquid crystal layer LC1 or between the organic insulating film I2 and the liquid crystal layer LC1.

The first electrodes E1 are provided on the inner surface side of the first transparent electrode 1 and are provided between the louver LV and the liquid crystal layer LC1. The first electrodes E1 are arranged in the first direction X with a second pitch P2. The second pitch P2 is less than the first pitch P1. As described later, each of the first electrodes E1 is formed into a stripe shape extending in the second direction Y, and they are parallel to each other.

The first alignment film AL1 covers the first electrodes E1 and also covers the organic insulating films I3 and I4. The first alignment film AL1 is in contact with the liquid crystal layer LC1.

The second substrate S2 comprises the second transparent substrate 2, a second electrode E2 and a second alignment film AL2.

The second transparent substrate 2 is, for example, an insulating substrate such as a glass substrate or a resinous substrate in a manner similar to that of the first transparent substrate 1. The second transparent substrate 2 comprises an inner surface 2A facing the liquid crystal layer LC1, and an outer surface 2B on the opposite side of the inner surface 2A. The outer surface 2B faces the polarizer PL1 shown in FIG. 1.

The second electrode E2 is provided on the inner surface 2A of the second transparent substrate 2 and faces the first electrodes E1 in the third direction Z. The first electrodes E1 and the second electrode E2 are transparent electrodes formed of a transparent conductive material such as indium tin oxide (ITO) or indium zinc oxide (IZO).

The second alignment film AL2 covers the second electrode E2 and is in contact with the liquid crystal layer LC1. The first alignment film AL1 and the second alignment film AL2 are, for example, horizontal alignment films having an alignment restriction force substantially parallel to the X-Y plane.

The liquid crystal layer LC1 is provided between the first alignment film AL1 and the second alignment film AL2. The thickness TLC of the liquid crystal layer LC1 in the third direction Z is greater than or equal to 10 µm.

The liquid crystal lens element LL consists of the first electrodes E1, the liquid crystal layer LC1 and the second electrode E2.

Figure 7:
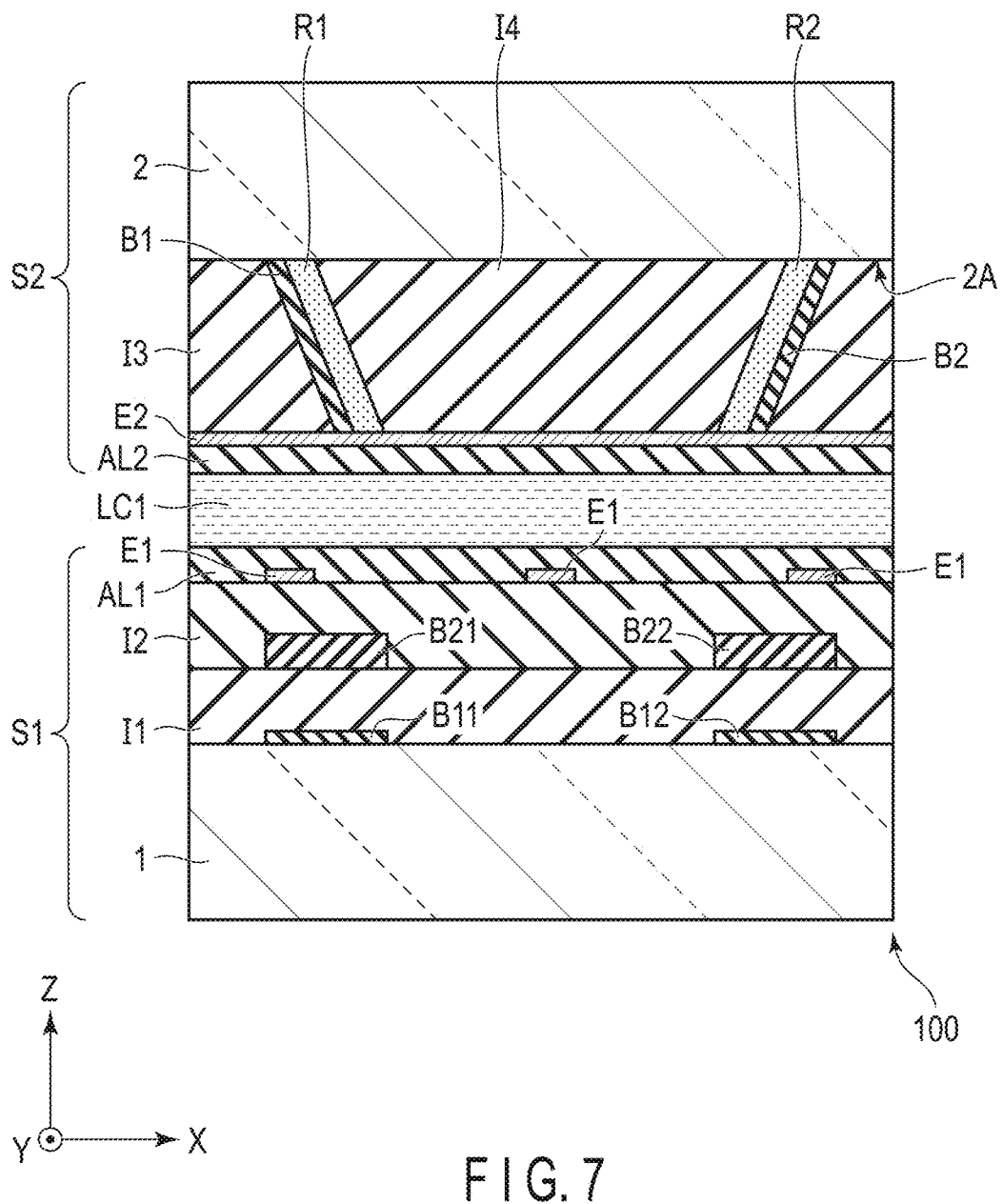
FIG. 7 is a cross-sectional view showing another configuration example of the structure of the viewing angle control element 100 shown in FIG. 1.

FIG. 7 is a cross-sectional view showing another configuration example of the structure of the viewing angle control element 100 shown in FIG. 1. The configuration example shown in FIG. 7 is different from the configuration example shown in FIG. 6 in respect that the first substrate S1 comprises the light shields B11 and B12, the light shields B21 and B22 and the organic insulating films I1 and I2 while the second substrate S2 comprises the light shields B1 and B2, the reflective layers R1 and R2 and the organic insulating films I3 and I4.

In the first substrate S1, the first electrodes E1 are provided on the organic insulating film I2. The first alignment film AL1 covers the first electrodes E1 and also covers the organic insulating film I2.

In the second substrate S2, the light-shielding layers B1 and B2, the reflective layers R1 and R2 and the organic insulating films I3 and I4 are provided on the inner surface 2A of the second transparent substrate 2. In other words, the light-shielding layers B1 and B2, the reflective layers R1 and R2 and the organic insulating films I3 and I4 constituting the louver LV are located between the second transparent substrate 2 and the liquid crystal layer LC1. The second electrode E2 is provided between the organic insulating film I3 and the liquid crystal layer LC1 and between the organic insulating film I4 and the liquid crystal layer LC1. The alignment film AL2 covers the second electrode E2.

Figure 8:
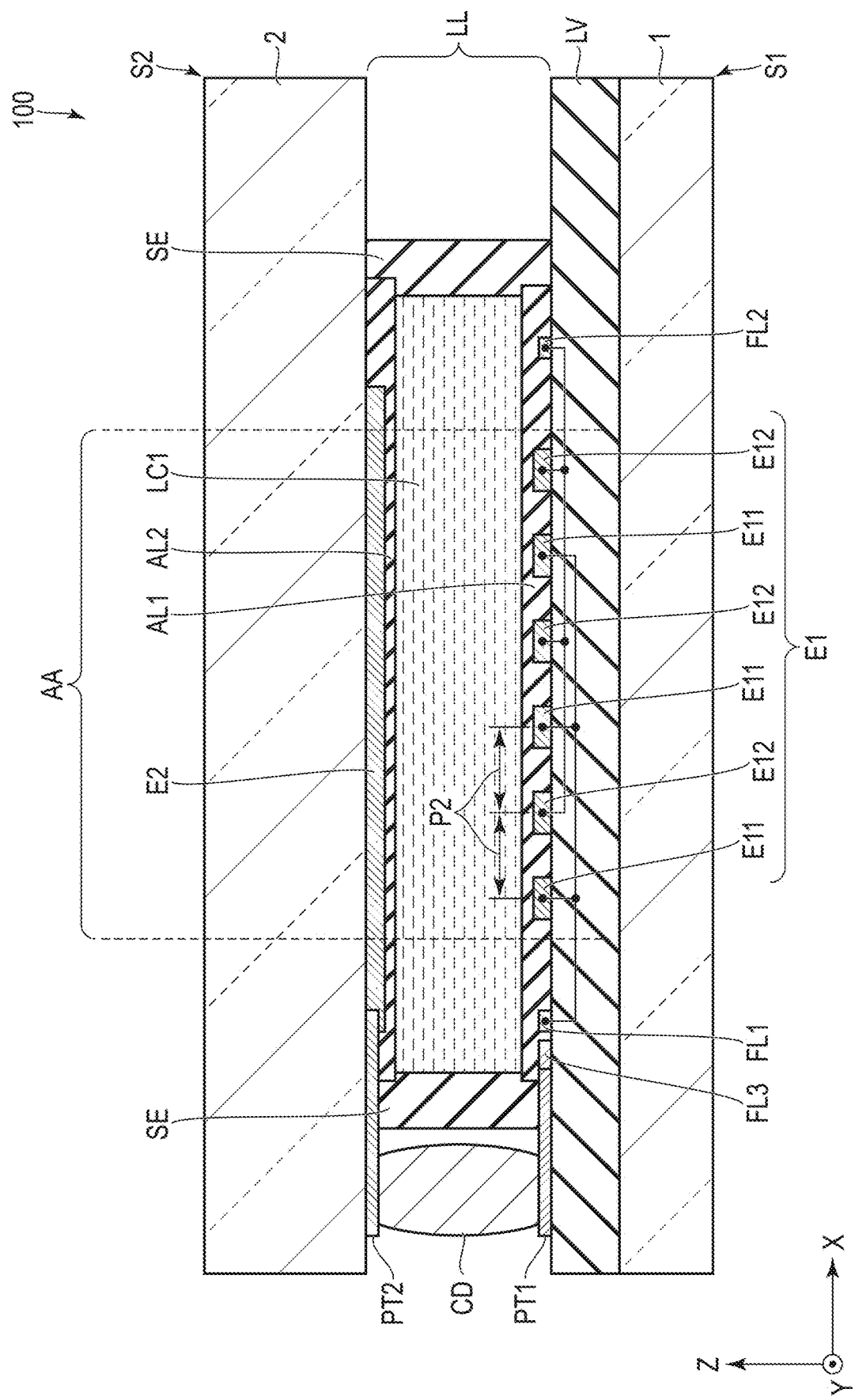
FIG. 8 is a cross-sectional view showing a configuration example of the liquid crystal lens element LL shown in FIG. 6.

FIG. 8 is a cross-sectional view showing a configuration example of the liquid crystal lens element LL shown in FIG. 6. It should be noted that the louver LV in the first substrate S1 is simplified in FIG. 8. The liquid crystal layer LC1 is sealed by a sealant SE.

The first electrode E1 includes a plurality of first strip electrodes E11 and a plurality of second stripe electrodes E12. The first stripe electrodes E11 and the second stripe electrodes E12 are alternately arranged in the first direction X with the second pitch P2.

The first stripe electrodes E11 are electrically connected to each other and are configured such that first voltage is applied to the first stripe electrodes E11 via a feed line FL1. The second stripe electrodes E12 are electrically connected to each other and are configured such that second voltage is applied to the second stripe electrodes E12 via a feed line FL2. The first voltage is voltage different from the second voltage. By this configuration, a potential difference is formed between the adjacent first and second stripe electrodes E11 and E12. Thus, an electric field can be formed in the liquid crystal layer LC1.

A feed terminal PT1 electrically connected to a feed line FL3 is extended to the external side relative to the sealant SE. The feed terminal PT1 is exposed from the first alignment film AL1.

A feed terminal PT2 electrically connected to the second electrode E2 is extended to the external side relative to the sealant SE. The feed terminal PT2 is located immediately above the feed terminal PT1. The feed terminal PT2 is exposed from the second alignment film AL2.

A conductive material CD is provided between the feed terminal PT1 and the feed terminal PT2 and electrically connects these terminals.

Now, this specification explains the optical function in the viewing angle control element 100 with reference to FIG. 9 and FIG. 10. In FIG. 9 and FIG. 10, only the configuration necessary for explanation is shown.

FIG. 9 is a diagram schematically showing the viewing angle control element 100 in an off-state (OFF) where no electric field is formed in the liquid crystal layer LC1.

Of the illumination light emitted from the illumination device IL, the p-polarized light POL1 which passed through the optical sheet OS enters the first substrate S1 of the viewing angle control element 100. The incident p-polarized light POL1 is collimated in the louver LV of the first substrate S1. The collimated p-polarized light POL1 enters the liquid crystal lens element LL.

In the liquid crystal layer LC1 in an off-state, liquid crystal molecules LM1 are initially aligned. In this off-state, the liquid crystal layer LC1 has substantially a uniform refractive-index distribution. Thus, p-polarized light POL1 which is the incident light on the liquid crystal lens element LL passes through the liquid crystal layer LC1 with little refraction (or divergence).

In this way, when the liquid crystal lens element LL of the viewing angle control element 100 is in an off-state, illumination light in which the degree of divergence is relatively less can be formed.

FIG. 10 is a diagram schematically showing the viewing angle control element 100 in an on-state (ON) where an electric field is formed in the liquid crystal layer LC1.

For example, when the liquid crystal layer LC1 has positive dielectric anisotropy, in an on-state where an electric field is formed in the liquid crystal layer LC1, liquid crystal molecules LM1 are aligned such that their long axes are parallel to the electric field. For example, in the liquid crystal layer LC1, an electric field is formed based on the potential difference between the adjacent first electrodes E1 and the potential difference between the first electrodes E1 and the second electrode E2. As this electric field acts on the liquid crystal layer LC1, an area in which liquid crystal molecules LM1 rise almost perpendicularly to the substrates, an area in which liquid crystal molecules LM1 are maintained in an initial alignment state, an area in which liquid crystal molecules LM1 rise obliquely with respect to the substrates and the like are formed in the liquid crystal layer LC1.

The liquid crystal layer LC1 has thickness TLC equivalent to the gap between the first substrate S1 and the second substrate S2. Liquid crystal molecules LM1 has refractive anisotropy Δn. The retardation of the liquid crystal layer LC1 is shown by OnTLC.

The liquid crystal layer LC1 in an on-state has a refractive-index distribution or retardation distribution corresponding to the alignment state of liquid crystal molecules LM1.

In this on-state, the collimated p-polarized light POL1 is caused to diverge by the effect of the refractive-index distribution of the liquid crystal layer LC1 when the light passes through the liquid crystal layer LC1. The degree of the divergence of transmitted light can be controlled by the voltage applied to the liquid crystal layer LC1.

Thus, when the liquid crystal lens element LL of the liquid crystal device 100 is in an on-state, illumination light in which the degree of divergence is relatively great can be formed.

Figure 11:
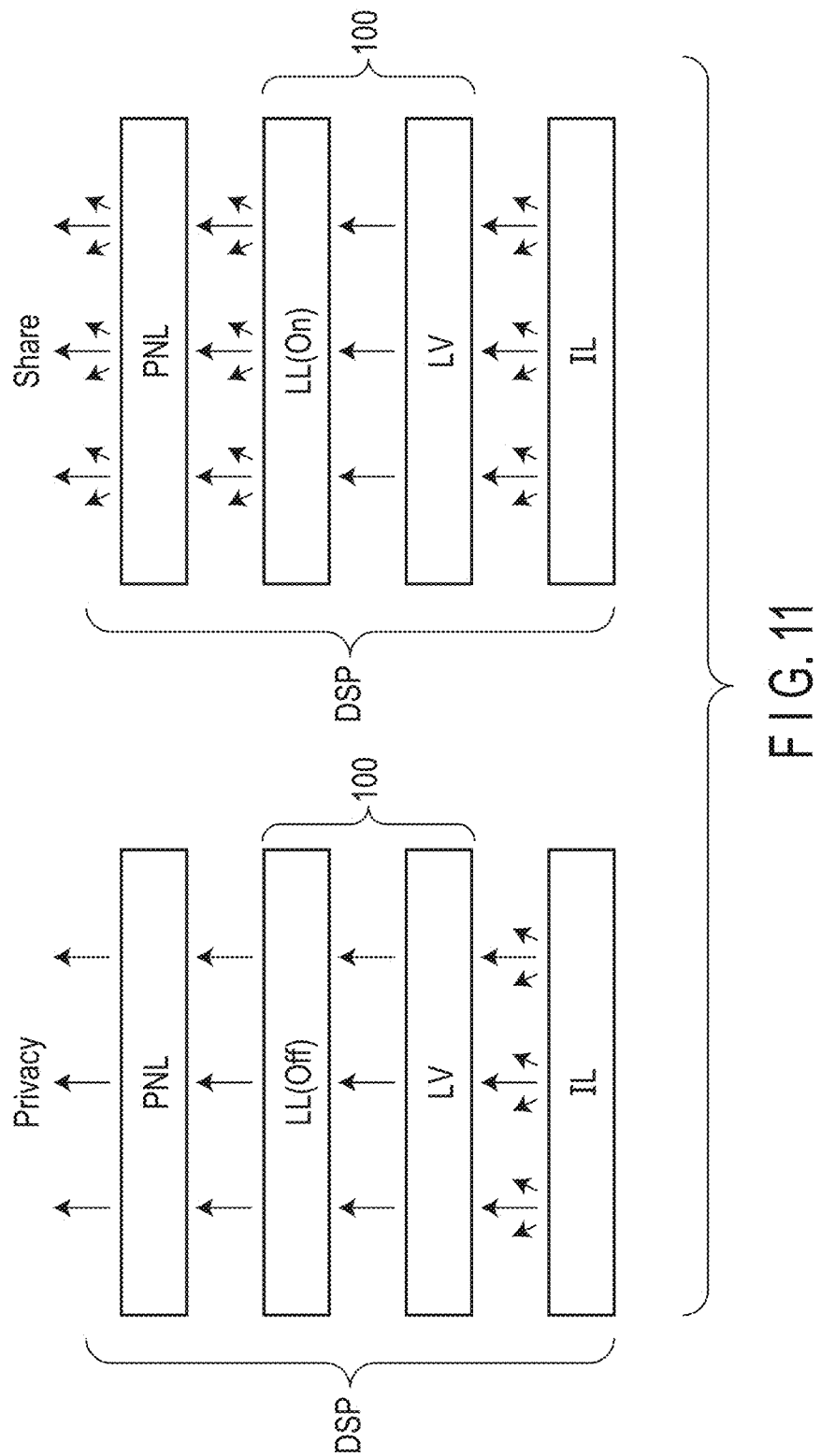
FIG. 11 is a diagram for explaining the display mode of the display device DSP.

FIG. 11 is a diagram for explaining the display mode of the display device DSP.

On the left side of the figure, the display device DSP in which the liquid crystal lens element LL is in an off-state is shown. The illumination light emitted from the illumination device IL and having diffusivity is collimated in the louver LV, and subsequently passes through the liquid crystal lens element LL with little divergence. Thus, the display panel PNL is illuminated with illumination light having less diffusivity (or high parallelism). When this illumination light is applied, it is possible to realize image display in privacy mode (narrow viewing angle mode) by the light which passed through the display panel PNL.

On the right side of the figure, the display device DSP in which the liquid crystal lens element LL is in an on-state is shown. The illumination light emitted from the illumination device IL and having diffusivity is collimated in the louver LV, and is subsequently caused to diverge in the liquid crystal lens element LL. Thus, the display panel PNL is illuminated with illumination light having great diffusivity (or less parallelism). When this illumination light is applied, it is possible to realize image display in share mode (wide viewing angle mode) by the light which passed through the display panel PNL.

In this way, the viewing angle control element 100 comprising the louver LV and the liquid crystal lens element LL can control the emission direction of the illumination light emitted from the illumination device IL.

In addition, the viewing angle control element 100 can realize the reduction in the thickness of the entire device compared to a case where an optical element comprising a louver is needed separately from a liquid crystal element for forming a liquid crystal lens.

Figure 12:
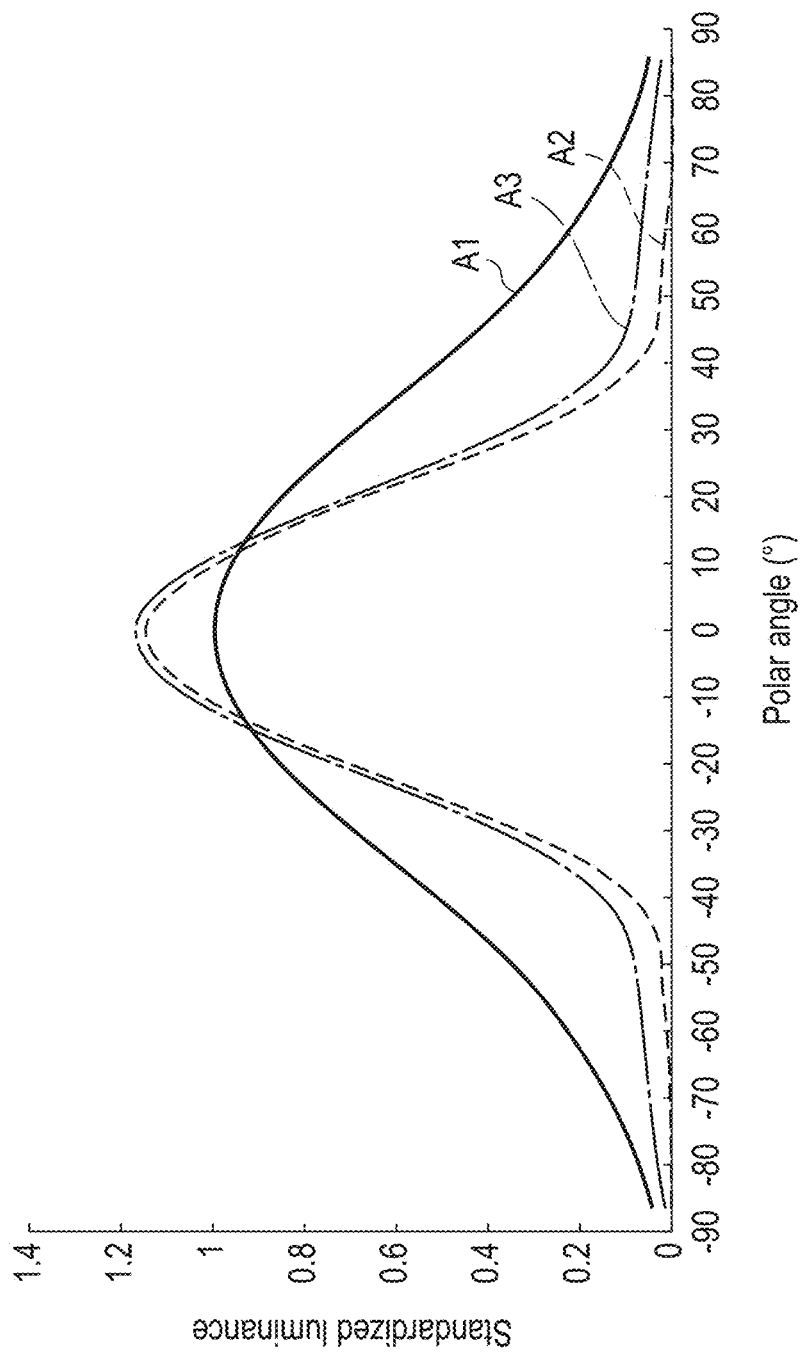
FIG. 12 is a diagram showing the viewing angle characteristics of the louver LV.

FIG. 12 is a diagram showing the viewing angle characteristics of the louver LV.

In the figure, the horizontal axis indicates a polar angle (°) with respect to the normal of the louver LV, here, a polar angle parallel to the first direction X in the X-Y plane described above. In the X-Y plane, the distal end of the arrow indicating the first direction X is assumed to be a positive angle, and the proximal end of the arrow indicating the first direction X is assumed to be a negative angle. In the figure, the vertical axis indicates standardized luminance.

In the figure, A1 is equivalent to the viewing angle characteristics of the illumination light which is emitted from the illumination device IL without the intervention of the louver LV. Here, the standardized luminance is equivalent to the relative value of the luminance which is standardized when the maximum luminance of illumination light in viewing angle characteristics A1 is assumed to be 1.

In the figure, A2 is equivalent to the viewing angle characteristics of the illumination light which is emitted from the illumination device IL via the louver LV explained with reference to FIG. 4. It is confirmed that the luminance in the frontal direction (the direction of a polar angle of 0°) in viewing angle characteristics A2 is increased compared to the luminance in the frontal direction in viewing angle characteristics A1. In addition, it is confirmed that the polar angle at which the luminance is less than 10% can be decreased to 40° or less, and the narrow viewing angle mode described above can be realized.

In the figure, A3 is equivalent to the viewing angle characteristics of illumination light when the light-shielding layers B1 to B4 are omitted in the louver LV explained with reference to FIG. 4. It is confirmed that the luminance in the frontal direction in viewing angle characteristics A3 increases in a manner similar to that of viewing angle characteristics A2. It is confirmed that, the polar angle at which the luminance is less than 10% in viewing angle characteristics A3 is greater than the polar angle at which the luminance is less than 10% in viewing angle characteristics A2, but is sufficiently less to realize a narrow viewing angle mode and can control the viewing angle.

FIG. 13 is a plan view showing examples of the first electrode E1 and the light shields B11 to B15. Here, of the light shields constituting the louver LV, only the light shields B11 to B15 located between the first transparent substrate 10 and the organic insulating film I1 are shown.

As described above, the first electrode E1 comprises the first and second stripe electrodes E11 and E12 which are alternately arranged in the first direction X. Each of the first stripe electrodes E11 and the second stripe electrodes E12 extends in the second direction Y.

The light shields B11 to B15 are arranged in order in the first direction X. The light shields B11 to B15 are parallel to each other. In the example shown in FIG. 13, the light shields B11 to B15 extend in substantially the second direction Y. However, they slightly incline with respect to the second direction Y. Thus, as seen in plan view, the light shields B11 to B15 intersect with the first electrode E1. In other words, the light shields B11 to B15 extend in a direction different from the extension direction of the first stripe electrodes E11 and the second stripe electrodes E12.

For example, this specification focuses attention on the light shield B11. As shown by the dotted line in the figure, when a direction parallel to the second direction Y is assumed to be a reference direction, the light shield B11 extends in a direction which rotates at angle θ clockwise from the reference direction. Angle θ1 is an acute angle, and is, for example, 4°.

When the liquid crystal lens element LL is configured, as the second pitch P2 is decreased, the application voltage of the liquid crystal layer LC1 can be reduced, and further, the thickness TLC of the liquid crystal layer LC1 can be reduced. Thus, the second pitch P2 should be preferably set so as to be a minimum pitch which can process the first electrode E1.

The first pitch P1 is set in terms of the required louver performance, aperture ratio, workability of the light shields, etc. The setting examples of the first pitch P1 are described later.

Figure 14:
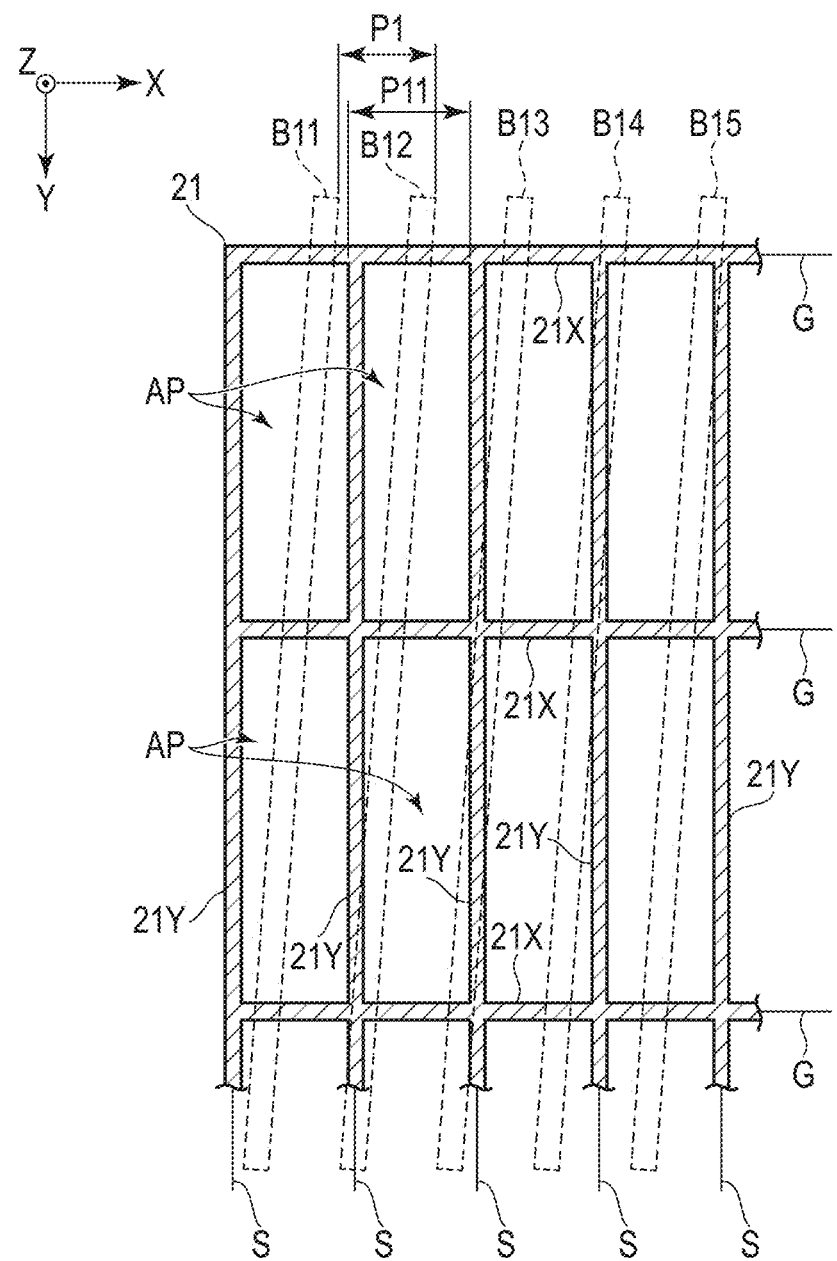
FIG. 14 is a plan view showing the light-shielding layer 21 of the display panel PNL and the light shields B11 to B15.

FIG. 14 is a plan view showing the light-shielding layer 21 of the display panel PNL and the light shields B11 to B15. The light shields B11 to B15 are shown by dotted lines.

The light-shielding layer 21 comprises first portions 21X extending in the first direction X and second portions 21Y extending in the second direction Y and is formed into a grating shape. For example, the first portions 21X overlap the scanning lines G, and the second portions 21Y overlap the signal lines S.

The rectangular apertures AP formed in the light-shielding layer 21 overlap the pixels PX or pixel electrodes PE shown in FIG. 3. For example, each aperture AP is formed into a rectangular shape extending in the second direction Y. However, the apertures AP are not limited to this shape.

The apertures AP are arrayed in matrix in the first direction X and the second direction Y. For example, the apertures AP are arranged in the first direction X with a pixel pitch P11.

The light shields B11 to B15 intersect with the first and second portions 21X and 21Y of the light-shielding layer 21. The first pitch P1 of the light shields B11 to B15 is less than the pixel pitch P11. For example, the pixel pitch P11 is 20 to 100 μm.

In this way, in the display device DSP, when the louver LV overlaps the display panel PNL, the light shields B11 to B15 intersect with the light-shielding layer 21, and further, the pixel pitch P11 is different from the first pitch P1. This configuration can prevent undesired moire and prevent the degradation of the display quality.

Figure 15:
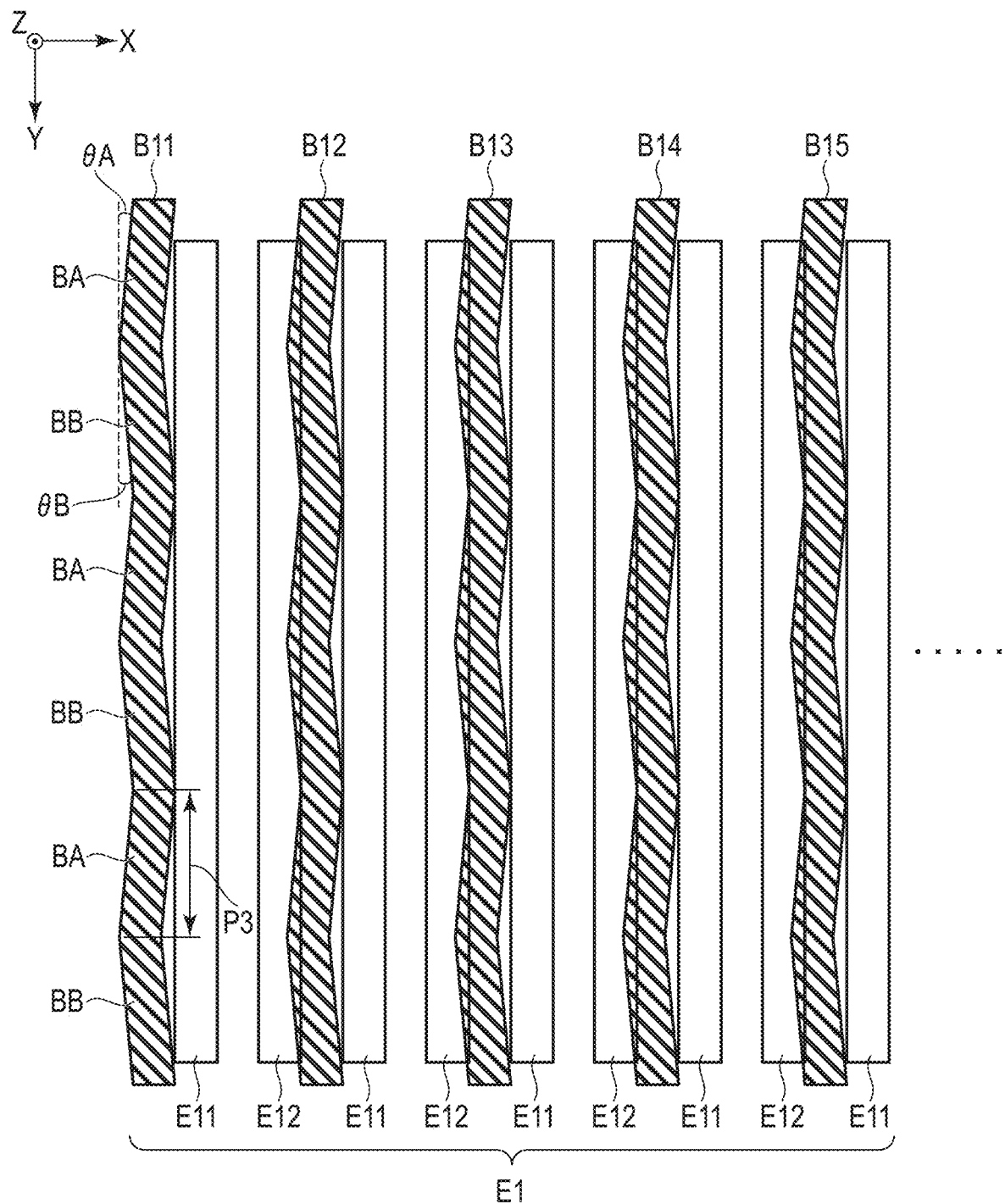
FIG. 15 is a plan view showing other examples of the first electrode E1 and the light shields B11 to B15.

FIG. 15 is a plan view showing other examples of the first electrode E1 and the light shields B11 to B15.

The light shields B11 to B15 shown in FIG. 15 are different from the light shields B11 to B15 shown in FIG. 13 in respect that they are formed into a zigzag shape.

The light shields B11 to B15 are parallel to each other and extend in a direction different from the second direction Y. As seen in plan view, the light shields B11 to B15 intersect with the first electrode E1.

When this specification focuses attention on the light shield B11, the light shield B11 comprises a plurality of first portions BA and a plurality of second portions BB. The first and second portions BA and BB extend in directions different from each other and are alternately arranged in the second direction Y. Each first portion BA extends in a direction which rotates at angle θA clockwise from a reference direction parallel to the second direction Y. Each second portion BB extends in a direction which rotates at angle θB counterclockwise from the reference direction. Angle θA is equal to angle θB. Both are acute angles and are, for example, 4°.

The visibility of moire tends to decrease as the pitch P3 of the first and second portions BA and BB in the second direction Y increases. For example, pitch P3 is greater than or equal to 100 μm.

Figure 16:
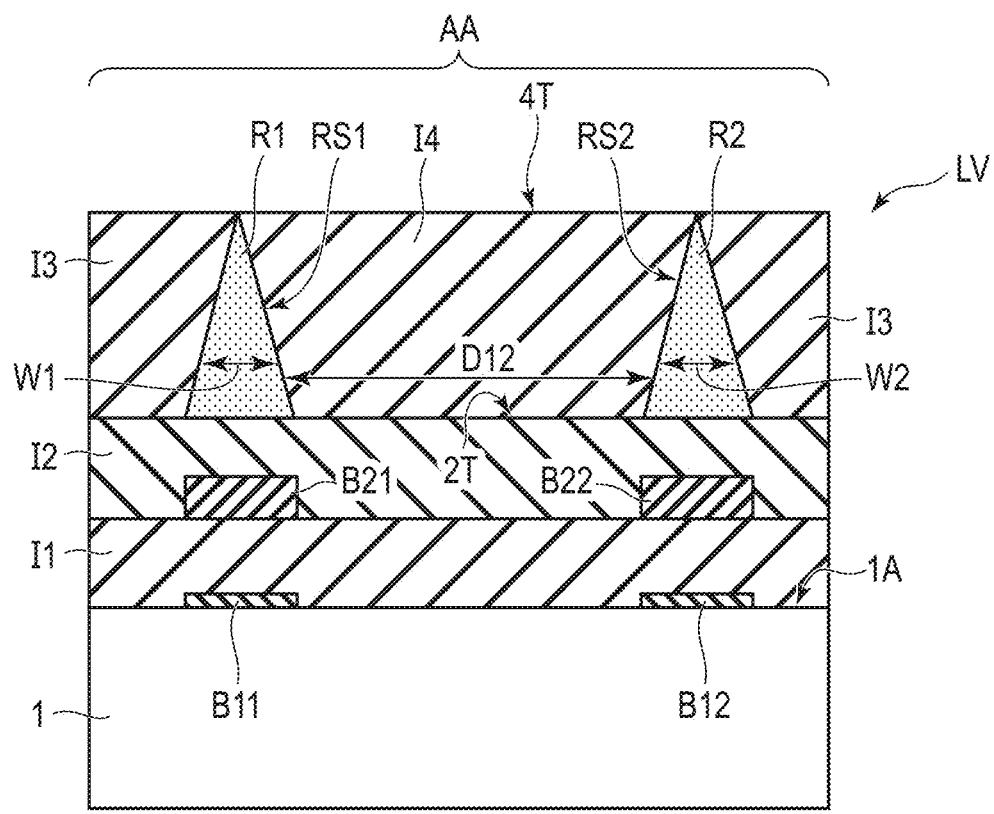
FIG. 16 is a cross-sectional view showing another example of the structure of the louver LV shown in FIG. 1.

FIG. 16 is a cross-sectional view showing another example of the structure of the louver LV shown in FIG. 1. Here, the cross-sectional structure of part of the effective area AA is shown. This specification mainly explains the differences from the example described with reference to FIG. 4.

The louver LV comprises the first transparent substrate 1, the light shields B11 and B12, the light shields B21 and B22, the reflective layers R1 and R2 and the organic insulating films I1 to I4.

The reflective layer R1 is equivalent to the first reflective layer. The reflective layer R2 is equivalent to the second reflective layer. These reflective layers R1 and R2 are provided on the organic insulating film I2. The width W1 of the reflective layer R1 in the first direction X decreases with distance from the first transparent substrate 1. Similarly, the width W2 of the reflective layer R2 decreases with distance from the first transparent substrate 1. In the example shown in FIG. 16, each of the reflective layers R1 and R2 has a triangular cross-sectional shape. However, the shape is not limited to the example shown in the figure. They may have a trapezoidal cross-sectional shape.

The reflective layer R1 overlaps the light shield B21 and is formed into a stripe shape parallel to the light shield B21. In other words, the reflective layer R1 is located immediately above the light shields B11 and B21 across the intervening organic insulating film I2. The reflective layer R2 overlaps the light shield B22 and is formed into a stripe shape parallel to the light shield B22. In other words, the reflective layer R2 is located immediately above the light shields B12 and B22 across the intervening organic insulating film I2.

The reflective layer R2 is spaced apart from the reflective layer R1. In other words, the upper surface 2T of the organic insulating film I2 is exposed between the reflective layer R1 and the reflective layer R2. The reflective layer R1 comprises the first reflective surface RS1 which is in contact with the organic insulating film I4.

The reflective layer R2 comprises the second reflective surface RS2 which is in contact with the organic insulating film I4.

The interval D12 between the first reflective surface RS1 and the second reflective surface RS2 in the first direction X increases with distance from the first transparent substrate 1. In other words, the width of the upper surface 2T between the first reflective surface RS1 and the second reflective surface RS2 is equivalent to the minimum value of interval D12. The width of the upper surface 4T between the first reflective surface RS1 and the second reflective surface RS2 is equivalent to the maximum value of interval D12.

In the louver LV of this example, effects similar to those of the louver LV described above are obtained.

In the examples of the viewing angle control element 100 described above, incident light diverges in the liquid crystal lens element LL or passes through the liquid crystal lens element LL with little divergence. However, the configuration is not limited to these examples. It is possible to apply an element which can control divergence and transmission in place of the liquid crystal lens element LL. For example, a polymer dispersed liquid crystal element can be applied.

The embodiment described above can provide a louver, a viewing angle control element and a display device by which the reduction in luminance can be prevented.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A louver comprising:
 a first transparent substrate;
 a first organic insulating film provided on an inner surface side of the first transparent substrate, and comprising a first inclined surface, a second inclined surface facing the first inclined surface, and a third inclined surface facing the second inclined surface;
 a first reflective layer provided along the first inclined surface;
 a second reflective layer spaced apart from the first reflective layer and provided along the second inclined surface;
 a second organic insulating film which covers the first reflective layer and the second reflective layer;
 a first light-shielding layer provided in the first inclined surface;
 a second light-shielding layer spaced apart from the first light-shielding layer and provided in the second inclined surface;
 a first light shield located between the first transparent substrate and the first light-shielding layer and formed of a metal material;

a second light shield located between the first transparent substrate and the second light-shielding layer and formed of a metal material;
a first insulating film which covers the first light shield and the second light shield;
a third light shield overlapping the first light shield, located between the first insulating film and the first light-shielding layer and formed of a black resinous material;
a fourth light shield overlapping the second light shield, located between the first insulating film and the second light-shielding layer and formed of a black resinous material; and
a second insulating film which covers the third light shield and the fourth light shield,
wherein
the first reflective layer comprises a first reflective surface which is in contact with the second organic insulating film,
the second reflective layer comprises a second reflective surface which is in contact with the second organic insulating film,
an interval between the first reflective surface and the second reflective surface increases with distance from the first transparent substrate,
the first reflective layer is stacked in the first light-shielding layer, and
the second reflective layer is stacked in the second light-shielding layer.

2. The louver of claim 1, further comprising:
a third light-shielding layer spaced apart from the second light-shielding layer and provided in the third inclined surface; and
a third reflective layer spaced apart from the second reflective layer, stacked in the third light-shielding layer and covered with the second organic insulating film, wherein
the third reflective layer comprises a third reflective surface which is in contact with the second organic insulating film, and
an interval between the second reflective surface and the third reflective surface decreases with distance from the first transparent substrate.

3. A viewing angle control element comprising:
a first transparent substrate;
a first electrode provided on an inner surface side of the first transparent substrate;
a first alignment film which covers the first electrode;
a second transparent substrate;
a second electrode provided on an inner surface side of the second transparent substrate and facing the first electrode;
a second alignment film which covers the second electrode;
a liquid crystal layer provided between the first alignment film and the second alignment film;
a first organic insulating film comprising a first inclined surface, a second inclined surface facing the first inclined surface, and a third inclined surface facing the second inclined surface;
a first light-shielding layer provided in the first inclined surface;
a second light-shielding layer spaced apart from the first light-shielding layer and provided in the second inclined surface;
a first reflective layer stacked in the first light-shielding layer;
a second reflective layer spaced apart from the first reflective layer and stacked in the second light-shielding layer;
a second organic insulating film which covers the first reflective layer and the second reflective layer;
a first light shield located between the first transparent substrate and the first light-shielding layer and formed of a metal material;
a second light shield located between the first transparent substrate and the second light-shielding layer and formed of a metal material;
a first insulating film which covers the first light shield and the second light shield;
a third light shield overlapping the first light shield, located between the first insulating film and the first light-shielding layer and formed of a black resinous material;
a fourth light shield overlapping the second light shield, located between the first insulating film and the second light-shielding layer and formed of a black resinous material; and
a second insulating film which covers the third light shield and the fourth light shield, wherein
the first reflective layer comprises a first reflective surface which is in contact with the second organic insulating film,
the second reflective layer comprises a second reflective surface which is in contact with the second organic insulating film, and
an interval between the first reflective surface and the second reflective surface increases with distance from the first transparent substrate.

4. The viewing angle control element of claim 3, further comprising:
a third light-shielding layer spaced apart from the second light-shielding layer and provided in the third inclined surface; and
a third reflective layer spaced apart from the second reflective layer, stacked in the third light-shielding layer and covered with the second organic insulating film, wherein
the third reflective layer comprises a third reflective surface which is in contact with the second organic insulating film, and
an interval between the second reflective surface and the third reflective surface decreases with distance from the first transparent substrate.

5. The viewing angle control element of claim 3, wherein
the first organic insulating film, the first light-shielding layer, the second light-shielding layer, the first reflective layer, the second reflective layer and the second organic insulating film are located between the second insulating film and the liquid crystal layer.

6. The viewing angle control element of claim 3, wherein
the first organic insulating film, the first light-shielding layer, the second light-shielding layer, the first reflective layer, the second reflective layer and the second organic insulating film are located between the liquid crystal layer and the second transparent substrate.

7. A display device comprising:
an illumination device;
a display panel comprising a plurality of pixels provided in matrix; and
a viewing angle control element provided between the illumination device and the display panel, wherein
the viewing angle control element comprises:
a first transparent substrate facing the illumination device;

a first electrode provided on an inner surface side of the first transparent substrate;
a first alignment film which covers the first electrode;
a second transparent substrate facing the display panel;
a second electrode provided on an inner surface side of the second transparent substrate and facing the first electrode;
a second alignment film which covers the second electrode;
a liquid crystal layer provided between the first alignment film and the second alignment film;
a first organic insulating film comprising a first inclined surface, a second inclined surface facing the first inclined surface, and a third inclined surface facing the second inclined surface;
a first light-shielding layer provided in the first inclined surface;
a second light-shielding layer spaced apart from the first light-shielding layer and provided in the second inclined surface;
a first reflective layer stacked in the first light-shielding layer;
a second reflective layer spaced apart from the first reflective layer and stacked in the second light-shielding layer; and
a second organic insulating film which covers the first reflective layer and the second reflective layer,
the first reflective layer comprises a first reflective surface which is in contact with the second organic insulating film,
the second reflective layer comprises a second reflective surface which is in contact with the second organic insulating film, and
an interval between the first reflective surface and the second reflective surface increases with distance from the first transparent substrate.

8. The display device of claim 7, further comprising:
a third light-shielding layer spaced apart from the second light-shielding layer and provided in the third inclined surface; and
a third reflective layer spaced apart from the second reflective layer, stacked in the third light-shielding layer and covered with the second organic insulating film, wherein
the third reflective layer comprises a third reflective surface which is in contact with the second organic insulating film, and
an interval between the second reflective surface and the third reflective surface decreases with distance from the first transparent substrate.

9. The display device of claim 7, further comprising:
a first light shield located between the first transparent substrate and the first light-shielding layer and formed of a metal material;
a second light shield located between the first transparent substrate and the second light-shielding layer and formed of a metal material;
a first insulating film which covers the first light shield and the second light shield;
a third light shield overlapping the first light shield, located between the first insulating film and the first light-shielding layer and formed of a black resinous material;
a fourth light shield overlapping the second light shield, located between the first insulating film and the second light-shielding layer and formed of a black resinous material; and
a second insulating film which covers the third light shield and the fourth light shield.

10. The display device of claim 9, wherein
the first organic insulating film, the first light-shielding layer, the second light-shielding layer, the first reflective layer, the second reflective layer and the second organic insulating film are located between the second insulating film and the liquid crystal layer.

11. The display device of claim 9, wherein
the first organic insulating film, the first light-shielding layer, the second light-shielding layer, the first reflective layer, the second reflective layer and the second organic insulating film are located between the liquid crystal layer and the second transparent substrate.

* * * * *